United States Patent
Holderbaum et al.

(10) Patent No.: US 7,041,632 B2
(45) Date of Patent: May 9, 2006

(54) PERFUMED DETERGENT SHAPED BODIES

(75) Inventors: Thomas Holderbaum, Monheim (DE); Ulrich Pegelow, Duesseldorf (DE); Bernd Larson, Erkelenz (DE); Harald Volk, Mondercange (DE)

(73) Assignee: Henkel Kommanditgesellschaft auf Aktien (Henkel KGaA), Duesseldorf (DE)

( * ) Notice: Subject to any disclaimer, the term of this patent is extended or adjusted under 35 U.S.C. 154(b) by 67 days.

(21) Appl. No.: 10/379,073

(22) Filed: Mar. 3, 2003

(65) Prior Publication Data

US 2003/0166492 A1    Sep. 4, 2003

(30) Foreign Application Priority Data

Mar. 1, 2002    (DE) ............................... 102 09 157

(51) Int. Cl.
   *C11D 17/00*    (2006.01)
(52) U.S. Cl. ...................................... 510/440; 510/441
(58) Field of Classification Search ................ 510/101, 510/349, 439, 440, 441
   See application file for complete search history.

(56) References Cited

U.S. PATENT DOCUMENTS 6,297,210 B1 * 10/2001 Hsu et al. .................... 510/520
6,498,135 B1 * 12/2002 Angell et al. ................ 510/441

FOREIGN PATENT DOCUMENTS

GB    1031831    *   6/1966
GB    2365440 A  *   2/2002
JP    09-175992 A *  12/1995

OTHER PUBLICATIONS

International Standard. Glass—Hydrolytic resistance of glass grains at 98° C.—Method of test and classification, ISO 719, pp. 1-5 (1985).
Hans Domininghaus "Die Kunststoffe und ihre Eigenschaften". 3rd Edition, VDI Verlag, Dusseldorf, p. 193 (1988).

* cited by examiner

Primary Examiner—John R. Hardee
(74) Attorney, Agent, or Firm—Glenn E. J. Murphy

(57) ABSTRACT

The invention relates to a process for the production of single-phase or multiphase detergent shaped bodies containing surfactant(s), builder(s), perfume and optionally other typical ingredients of detergent shaped bodies, in which a perfume-free detergent shaped body is subsequently treated with a perfume or perfume-containing active-substance mixtures. The end products of this flexible process are distinguished by an improved odor impression.

14 Claims, No Drawings

PERFUMED DETERGENT SHAPED BODIES

BACKGROUND OF THE INVENTION

This invention relates generally to detergent shaped bodies of the type used for dosing washing- and cleaning-active (detersive) ingredients in laundry or dishwashing detergents. More particularly, the invention relates to a process for the production of perfumed single-phase or multiphase detergent shaped bodies.

Detergent shaped bodies are widely described in the prior art literature and, being easy to dose, are enjoying increasing popularity among consumers. Detergent shaped bodies have a number of advantages over powder-form products. They are easier to dose and handle and, by virtue of their compact structure, have advantages in regard to storage and transportation. Accordingly, detergent shaped bodies are also comprehensively described in the patent literature. Besides detersive ingredients, such as builders and surfactants, perfumes are among the most common ingredients of these shaped bodies. Perfumes mainly perform two functions in detergent shaped bodies. First, they provide the consumer with an unmistakable product odor typical of the particular detergent. The detergent can thus be identified not only by its appearance, but also by its fragrance. Second, perfumes are also intended to perfume the article to be cleaned, such as articles of clothing for example. This second perfume impression conveys a feeling of "freshness" and "cleanness" to the consumer and thus increases satisfaction with the corresponding detergent. Accordingly, the question of which perfumes or perfume combinations should be present in a detergent and what its perfume content should be to secure high consumer acceptance depends to a very large extent on the subjective perception of odor by the consumer or individual consumer groups. In the experience of detergent manufacturers, the answers to this question differ significantly in the various countries of Europe. Because of this, detergents of the same brand will generally contain different perfumes or perfume combinations or different contents of these perfumes or perfume combinations in different countries. However, this fact is not without consequences for the production and production costs of the detergents. The perfumes used in detergents are generally liquid or viscous substances. Their perfume content is generally of the order of 0.1 to 5% by weight. The content and type of perfume oil used has a direct bearing on the processability of detergent premixes. Particularly in the production of shaped bodies, for example by tabletting or extrusion, changes to the perfumes present or to their percentage contents lead, for example, to differences in the tabletting or extrusion behavior of the premixes as reflected, for example, in caking on tabletting punches or in reduced heat or pressure resistance of the mixture during the extrusion process. Accordingly, changes to perfume formulations often necessitate changes to their overall formulation on process-related grounds. This means that the manufacturer of perfumed detergents has to develop and produce a large number of differently formulated detergents. Accordingly, the problem addressed by the present invention was to provide a process for the production of detergents which would enable the detergents to be flexibly perfumed without any of the above-mentioned production disadvantages so that the development and production costs of the detergents could be reduced. This process would be independent of the formulation of the detergent and independent of the nature of the perfume. Another problem addressed by the invention was to improve the availability of perfumes in detergents, i.e. to improve their external effect and hence to reduce the perfume content of the detergents.

It has now surprisingly been found that these problems can be solved by the subsequent perfuming of a shaped perfume-free detergent premix providing the perfume or perfume-containing active-substance mixture subsequently applied has a perfume content of at least 20% by weight.

DESCRIPTION OF THE INVENTION

In a first embodiment, therefore, the present invention relates to a process for the production of single-phase or multiphase detergent shaped bodies containing surfactant(s), builder(s), perfume and optionally other typical ingredients of detergent shaped bodies, characterized in that a perfume-free detergent premix is converted by a shaping process into a shaped body and then treated with one or more perfume(s) and/or one or more perfume-containing active-substance mixture(s) with a perfume content of at least 20% by weight, based on the total weight of the perfume-containing active-substance mixture.

The process according to the invention has the advantage of increased flexibility in the production of perfumed detergent shaped bodies. Starting out from a single formulation for a perfume-free detergent premix and the shaped bodies produced therefrom, a large number of different products with different perfumes can be produced by subsequent application of perfumes or perfume-containing mixtures. By varying the perfume notes of perfumes or perfume-containing active-substance mixtures subsequently applied, consumer requirements can be satisfied and various markets served in a simple and inexpensive manner. In addition, the process according to the invention is capable of reducing the total quantity of perfume(s) used in the detergent shaped bodies. By subsequently treating the shaped bodies with perfume and/or perfume-containing active-substance mixtures, it is possible to perfume only those parts or spatial elements of the shaped body that are near the surface and to avoid complete "impregnation" of the shaped bodies with perfume. However, perfumes near the surface are particularly critical in regard to the external effect, i.e. the immediate product impression, because only those perfumes are available to and noticeable by the consumer. This effect according to the invention is the more intensive, the greater the concentration of the perfumes or perfume mixtures subsequently applied. In addition, high perfume contents of the perfume-containing active-substance mixtures subsequently applied have the advantage of reducing the overall volume of the active-substance mixture used for the subsequent perfuming and of making the process easier to carry out. According to the invention, therefore, it has proved to be essential to use either perfume or active-substance mixtures which, besides perfume, contain all the other substances selected from the group of detersive substances and/or solvents or dispersants in a quantity of at most 80% by weight, preferably at most 70% by weight, more preferably at most 55% by weight and most preferably at most 40% by weight, based on the total weight of the perfume-containing active-substance mixture. Thus, in the context of the present invention, perfumes diluted, for example, by (organic) solvents are regarded as perfume-containing active-substance mixtures just as much as mixtures of 80% by weight surfactant(s) and/or polymers and 20% by weight of a perfume.

Suitable perfume oils or perfumes for the purposes of the invention include individual perfume compounds, for example synthetic products of the ester, ether, aldehyde, ketone, alcohol and hydrocarbon type. Perfume compounds of the ester type are, for example, benzyl acetate, phenoxyethyl isobutyrate, p-tert.butyl cyclohexyl acetate, linalyl acetate, dimethyl benzyl carbinyl acetate, phenyl ethyl acetate, linalyl benzoate, benzyl formate, ethyl methyl phenyl glycinate, allyl cyclohexyl propionate, styrallyl propionate and benzyl salicylate. The ethers include, for example, benzyl ethyl ether; the aldehydes include, for example, the linear alkanals containing 8 to 18 carbon atoms, citral, citronellal, citronellyloxyacetaldehyde, cyclamen aldehyde, hydroxycitronellal, lilial and bourgeonal; the ketones include, for example, the ionones, α-isomethyl ionone and methyl cedryl ketone; the alcohols include anethol, citronellol, eugenol, geraniol, linalool, phenyl ethyl alcohol and terpineol and the hydrocarbons include, above all, the terpenes, such as limonene and pinene. However, mixtures of various perfumes which together produce an attractive perfume note are preferably used. Perfume oils such as these may also contain natural perfume mixtures obtainable from vegetable sources, for example pine, citrus, jasmine, patchouli, rose or ylang-ylang oil. Also suitable are clary oil, camomile oil, clove oil, melissa oil, mint oil, cinnamon leaf oil, lime blossom oil, juniper berry oil, vetiver oil, olibanum oil, galbanum oil and ladanum oil and orange blossom oil, neroli oil, orange peel oil and sandalwood oil.

The general description of the perfumes suitable for use in accordance with the invention (see above) represents the various classes of perfumes in general terms. In order to be noticeable, a perfume has to be volatile, its molecular weight being an important factor along with the nature of the functional groups and the structure of the chemical compound. Thus, most perfumes have molecular weights of up to about 200 dalton, molecular weights of 300 dalton and higher being more the exception. In view of the differences in volatility of perfumes, the odor of a perfume or fragrance composed of several perfumes changes during the evaporation process, the odor impressions being divided into the top note, the middle note or body and the end note or dry out. Since odor perception is also based to a large extent on odor intensity, the top note of a perfume or fragrance does not consist solely of readily volatile compounds whereas the end note or dry out consists largely of less volatile, i.e. firmly adhering, perfumes. In the composition of perfumes, more readily volatile perfumes may be fixed, for example, to certain "fixatives", which prevents them from vaporizing too rapidly. Accordingly, in the following classification of perfumes into "readily volatile" and "firmly adhering" perfumes, nothing is said about the odor impression or about whether the corresponding perfume is perceived as a top note or middle note.

Both the product odor and—on completion of the cleaning and care process—the fragrance of laundry, for example, can be influenced by the choice of suitable perfumes or perfume oils for the compositions according to the invention. The use of firmly adhering perfumes is favorable for laundry fragrance while more readily volatile perfumes may be used for perfuming the product. Firmly adhering perfumes suitable for use in accordance with the present invention are, for example, the essential oils, such as angelica root oil, aniseed oil, arnica flowers oil, basil oil, bay oil, bergamot oil, champax blossom oil, silver fir oil, silver fir cone oil, elemi oil, eucalyptus oil, fennel oil, pine needle oil, galbanum oil, geranium oil, ginger grass oil, guaiac wood oil, Indian wood oil, helichrysum oil, ho oil, ginger oil, iris oil, cajeput oil, sweet flag oil, camomile oil, camphor oil, canaga oil, cardamom oil, cassia oil, Scotch fir oil, copaiba balsam oil, coriander oil, spearmint oil, caraway oil, cumin oil, lavender oil, lemon grass oil, limette oil, mandarin oil, melissa oil, amber seed oil, myrrh oil, clove oil, neroli oil, niaouli oil, olibanum oil, orange oil, origanum oil, palmarosa oil, patchouli oil, Peru balsam oil, petit grain oil, pepper oil, peppermint oil, pimento oil, pine oil, rose oil, rosemary oil, sandalwood oil, celery seed oil, lavender spike oil, Japanese anise oil, turpentine oil, thuja oil, thyme oil, verbena oil, vetivert oil, juniper berry oil, wormwood oil, wintergreen oil, ylang-ylang oil, ysop oil, cinnamon oil, cinnamon leaf oil, citronella oil, citrus oil and cypress oil. However, relatively high-boiling or solid perfumes of natural or synthetic origin may also be used in accordance with the invention as firmly adhering perfumes or perfume mixtures. These compounds include those mentioned in the following and mixtures thereof: ambrettolide, α-amyl cinnamaldehyde, anethole, anisaldehyde, anisalcohol, anisole, methyl anthranilate, acetophenone, benzyl acetone, benzaldehyde, ethyl benzoate, benzophenone, benzyl alcohol, benzyl acetate, benzyl benzoate, benzyl formate, benzyl valerate, borneol, bornyl acetate, α-bromostyrene, n-decyl aldehyde, n-dodecyl aldehyde, eugenol, eugenol methyl ether, eucalyptol, farnesol, fenchone, fenchyl acetate, geranyl acetate, geranyl formate, heliotropin, methyl heptyne carboxylate, heptaldehyde, hydroquinone dimethyl ether, hydroxycinnamaldehyde, hydroxycinnamyl alcohol, indole, irone, isoeugenol, isoeugenol methyl ether, isosafrol, jasmone, camphor, carvacrol, carvone, p-cresol methyl ether, coumarin, p-methoxyacetophenone, methyl-n-amyl ketone, methyl anthranilic acid methyl ester, p-methyl acetophenone, methyl chavicol, p-methyl quinoline, methyl-β-naphthyl ketone, methyl n-nonyl acetaldehyde, methyl n-nonyl ketone, muskone, β-naphthol ethyl ether, β-naphthol methyl ether, nerol, nitrobenzene, n-nonyl aldehyde, nonyl alcohol, n-octyl aldehyde, p-oxyacetophenone, pentadecanolide, β-phenyl ethyl alcohol, phenyl acetaldehyde dimethyl acetal, phenyl acetic acid, pulegone, safrol, isoamyl salicylate, methyl salicylate, hexyl salicylate, cyclohexyl salicylate, santalol, scatol, terpineol, thymene, thymol, γ-undecalactone, vanillin, veratrum aldehyde, cinnamaldehyde, cinnamyl alcohol, cinnamic acid, ethyl cinnamate, benzyl cinnamate. The more readily volatile perfumes include, in particular, the relatively low-boiling perfumes of natural or synthetic origin which may be used either individually or in the form of mixtures. Examples of more readily volatile perfumes are alkyl isothiocyanates (alkyl mustard oils), butanedione, limonene, linalool, linalyl acetate and propionate, menthol, menthone, methyl n-heptenone, phellandrene, phenyl acetaldehyde, terpinyl acetate, citral, citronellal.

According to the teaching of the present invention, the detergent shaped bodies obtained by a shaping process are subsequently perfumed by one or more perfume(s) and/or one or more perfume-containing active-substance mixture(s) with a perfume content of at least 20% by weight. Perfume-containing active-substance mixtures in the context of the present invention are, for example, solutions or emulsions of perfumes in solvents or dispersants or even perfume-containing solid carrier materials suspended in a dispersant. In addition, the perfume-containing active-substance mixtures may preferably contain one or more typical detergent ingredients, substances from the group of surfactants being particularly preferred.

Besides water, nonaqueous solvents in particular have proved to be advantageous solvents or dispersants for the above-mentioned perfumes. Nonaqueous solvents which may be used as a constituent of the perfume-containing active-substance mixtures include, in particular, organic solvents of which only the most important can be mentioned here: alcohols (methanol, ethanol, propanols, butanols, octanols, cylohexanol), glycols (ethylene glycol, diethylene glycol), ethers and glycol ethers (diethyl ether, dibutyl ether, anisole, dioxane, tetrahydrofuran, mono-, di-, tri- and polyethyleneglycol ethers), ketones (acetone, butanone, cyclohexanone), esters (acetic acid esters, glycol ester), amides and other nitrogen compounds (dimethyl formamide, pyridine, N-methyl pyrrolidone, acetonitrile), sulfur compounds (carbon disulfide, dimethyl sulfoxide, sulfolan), nitro compounds (nitrobenzene), halogenated hydrocarbons (dichloromethane, chloroform, tetrachloromethane, tri-, tetrachloroethene, 1,2-dichloroethane, chlorofluorocarbons), hydrocarbons (spirits, petroleum ethers, cyclohexane, methyl cyclohexane, decalin, terpene solvents, benzene, toluene, xylenes). Alternatively, the pure solvents may even be replaced by mixtures which, for example, advantageously combine the dissolving properties of various solvents.

Other preferred solvents or dispersants for the perfumes used are meltable or softenable substances from the group of waxes, paraffins, polyalkylene glycols, etc. The meltable or softenable substances preferably have a melting range of between about 45° C. and about 75° C. In the present case, this means that the melting range lies within the temperature range indicated and does not denote the extent of the melting range.

"Waxes" in the context of the present invention are understood to be any of a number of natural or synthetic substances which generally melt above 40° C. without decomposing and, even just above their melting point, are of relatively low viscosity and non-stringing. Their consistency and solubility are dependent to a large extent on temperature. Waxes are divided into three groups according to their origin, namely: natural waxes, chemically modified waxes and synthetic waxes.

The natural waxes include, for example, vegetable waxes, such as candelilla wax, carnauba wax, Japan wax, esparto grass wax, cork wax, guaruma wax, rice oil wax, sugar cane wax, ouricury wax or montan wax, animal waxes, such as bees wax, shellac wax, spermaceti, lanolin (wool wax) or uropygial fat, mineral waxes, such as ceresine or ozocerite (earth wax), or petrochemical waxes, such as petrolatum, paraffin waxes or microwaxes.

The chemically modified waxes include, for example, hard waxes, such as montan ester waxes, sassol waxes or hydrogenated jojoba waxes.

Synthetic waxes are generally understood to be polyalkylene waxes or polyalkylene glycol waxes. Compounds from other classes which satisfy the above-mentioned softening point requirements may also be used as the meltable or softenable substances for the compositions which harden by cooling. For example, higher esters of phthalic acid, more particularly the dicyclohexyl phthalate commercially available under the name of Unimoll® 66 (Bayer AG), have proved to be suitable synthetic compounds. Synthetic waxes of lower carboxylic acids and fatty alcohols, for example the dimyristyl tartrate commercially available under the name of Cosmacol® ETLP (Condea), are also suitable. Conversely, synthetic or partly synthetic esters of lower alcohols with fatty acids from native sources may also be used. This class of substances includes, for example, Tegin® 90 (Goldschmidt), a glycerol monostearate palmitate. Shellac, for example Schellack-KPS-Dreiring-SP (Kalkhoff GmbH), may also be used as a meltable or softenable substance in accordance with the invention.

In the context of the invention, the waxes also include, for example, the so-called wax alcohols. Wax alcohols are relatively high molecular weight water-insoluble fatty alcohols generally containing about 22 to 40 carbon atoms. The wax alcohols are used as a principal constituent of many natural waxes, for example in the form of wax esters of relatively high molecular weight fatty acids (wax acids). Examples of wax alcohols are lignoceryl alcohol (1-tetracosanol), cetyl alcohol, myristyl alcohol or melissyl alcohol. Other usable meltable and softenable substances are the wool wax alcohols which are understood to be triterpenoid and steroid alcohols, for example the lanolin obtainable, for example, under the name of Argowax® (Pamentier & Co.). According to the invention, fatty acid glycerol esters or fatty acid alkanolamides and also water-insoluble or substantially water-insoluble polyalkylene glycol compounds may also be used at least partly as a constituent of the meltable or softenable substances.

Particularly preferred meltable or softenable substances are those belonging to the group of polyethylene glycols (PEGs) and/or polypropylene glycols (PPGs), polyethylene glycols with molecular weights of 1,500 to 36,000 being preferred, those with molecular weights of 2,000 to 6,000 being particularly preferred and those with molecular weights of 3,000 to 5,000 being most particularly preferred. Corresponding processes which are characterized in that the plastically deformable compositions contain at least one substance from the group of polyethylene glycols (PEGs) and/or polypropylene glycols (PPGs) are preferred.

Particularly preferred compositions are characterized in that propylene glycols (PPGs) and/or polyethylene glycols (PEGs) are present as sole meltable or softenable substances. Polypropylene glycols (PPGs for short) usable in accordance with the invention are polymers which correspond to the following general formula:

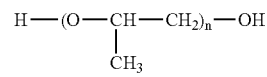

where n may assume a value of 10 to 2,000. Preferred PPGs have molecular weights of 1,000 to 10,000 corresponding to "n" values of 17 to ca. 170.

According to the invention, preferred polyethylene glycols (PEGs for short) are polymers of ethylene glycol which correspond to the following general formula:

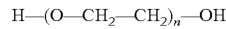

where n may assume a value of 20 to ca. 1,000. The above-mentioned preferred molecular weight ranges correspond to preferred ranges for the value of n in formula IV of ca. 30 to ca. 820 (exactly: 34 to 818), more preferably ca. 40 to ca. 150 (exactly: 45 to 136) and more particularly ca., 70 to ca. 120 (exactly: 68 to 113).

In another preferred embodiment, the meltable and softenable substances used in accordance with the invention predominantly contain paraffin wax. In other words, at least 50% by weight—and preferably more—of the total of meltable or softenable substances present consists of paraffin wax. Paraffin wax contents (based on total quantity of meltable or softenable substances) of about 60% by weight, about 70% by weight or about 80% by weight are particularly suitable, even higher contents of, for example, more than 90% by weight being particularly preferred. In one particular embodiment of the invention, the total quantity of meltable or softenable substances of at least one composition consists entirely of paraffin wax.

So far as the present invention is concerned, paraffin waxes have the advantage over the other natural waxes mentioned that the waxes do not undergo hydrolysis in an alkaline detergent environment (as might be expected, for example, in the case of the wax esters), because a paraffin wax does not contain any hydrolyzable groups.

Paraffin waxes consist principally of alkanes and small amounts of iso- and cycloalkanes. The paraffin to be used in accordance with the invention preferably contains virtually no constituents with a melting point above 70° C. and, more preferably, above 60° C. If the temperature in the cleaning solution falls below this melting temperature in the wash liquor, high-melting alkanes in the paraffin can leave unwanted wax residues behind on the surfaces to be cleaned or the ware to be cleaned. Wax residues such as these generally leave the cleaned surface with an unattractive appearance and should therefore be avoided.

Preferred meltable or softenable substances or substance mixtures to be processed contain at least one paraffin wax with a melting range of 50° C. to 60° C. preferred processes being characterized in that the deformable composition(s) contain(s) a paraffin wax with a melting range of 50 to 55° C.

Other preferred solvents or dispersants for the perfumes used are selected from the group of water-soluble polymers of which only the most important are listed here: water-soluble nonionic polymers (polyvinyl pyrrolidones, vinyl pyrrolidone/vinyl ester copolymers, cellulose ethers); water-soluble amphoteric polymers (alkyl acrylamide/acrylic acid copolymers, alkyl acrylamide/methacrylic acid copolymers, alkyl acrylamide/methyl methacrylic acid copolymers, alkyl acrylamide/acrylic acid/alkylaminoalkyl(meth)acrylic acid copolymers, alkyl acrylamide/methacrylic acid/alkylaminoalkyl(meth)acrylic acid copolymers, alkyl acrylamide/methyl methacrylic acid/alkylaminoalkyl(meth)acrylic acid copolymers, alkyl acrylamide/alkyl methacrylate/alkylaminoethyl methacrylate/alkyl methacrylate copolymers); copolymers of unsaturated carboxylic acids, cationically derivatized unsaturated carboxylic acids, optionally other ionic or nonionic monomers; water-soluble zwitterionic polymers (acrylamidoalkyl trialkylammonium chloride/acrylic acid copolymers and alkali metal and ammonium salts thereof, acrylamidoalkyl trialkyl ammonium chloride/methacrylic acid copolymers and alkali metal and ammonium salts thereof, methacroylethyl betaine/methacrylate copolymers); water-soluble anionic polymers (vinyl acetate/crotonic acid copolymers, vinyl pyrrolidone/vinyl acrylate copolymers, acrylic acid/ethyl acrylate/N-tert.butyl acrylamide terpolymers, graft polymers of vinyl esters, esters of acrylic acid or methacrylic acid individually or in admixture copolymerized with crotonic acid, acrylic acid or methacrylic acid with polyalkylene oxides and/or polyalkylene glycols); grafted and crosslinked copolymers (from the copolymerization of a) at least one monomer of the nonionic type, b) at least one monomer of the ionic type, c) polyethylene glycol and d) a crosslinking agent; copolymers obtained by copolymerization of at least one monomer from each of the three following groups: a) esters of unsaturated alcohols and short-chain saturated carboxylic acids and/or esters of short-chain saturated alcohols and unsaturated carboxylic acids, b) unsaturated carboxylic acids, c) esters of long-chain carboxylic acids and unsaturated alcohols and/or esters of carboxylic acids from the group of saturated or unsaturated, linear or branched $C_{8-18}$ alcohols; terpolymers of crotonic acid, vinyl acetate and an allyl or methallyl ester; tetra- and pentapolymers of a) crotonic acid or allyloxyacetic acid, b) vinyl acetate or vinyl propionate, c) branched allyl or methallyl esters, d) vinyl ethers, vinyl esters or linear allyl or methallyl esters; crotonic acid copolymers with one or more monomers from the group consisting of ethylene, vinyl benzene, vinyl methyl ether, acrylamide and water-soluble salts thereof; terpolymers of vinyl acetate, crotonic acid and vinyl esters of a saturated aliphatic α-branched monocarboxylic acid); water-soluble cationic polymers (quaternized cellulose derivatives, polysiloxanes containing quaternary groups, cationic guar derivatives, polymeric dimethyl diallyl ammonium salts and copolymers thereof with esters and amides of acrylic acid and methacrylic acid, copolymers of vinylpyrrolidone with quaternized derivatives of dialkyl aminoacrylate and methacrylate, vinyl pyrrolidone/methoimidazolinium chloride copolymers, quaternized polyvinyl alcohol, polymers known by the INCI names of Polyquaternium 2, Polyquaternium 17, Polyquaternium 18 and Polyquaternium 27). Water-soluble polymers in the context of the invention are polymers of which more than 2.5% by weight is soluble in water at room temperature.

Preferred solvents or dispersants from the group of nonaqueous solvents, waxes, paraffins, polyalkylene glycols or water-soluble polymers may be used individually or in the form of mixtures in the process according to the invention. Accordingly, in a preferred embodiment, the present invention relates to a process in which a perfume-containing active-substance mixture containing at least 10% by weight, preferably at least 30% by weight and more particularly at least 50% by weight of nonaqueous solvents and/or waxes and/or paraffins and/or polyalkylene glycols and/or water-soluble polymers is used.

According to the foregoing, the process according to the invention is based on the subsequent perfuming of a shaped detergent premix. The shaping process for producing the perfume-free shaped body may be freely selected from the large number of shaping processes known to the expert. The basic success of the process according to the invention is not influenced by the choice of the shaping process. However, tabletting, extrusion, roller compacting, solidification, sintering and crystallization of the detergent premixes to form perfume-free shaped bodies have proved to be particularly advantageous. According to the invention, tabletting is a particularly preferred shaping process.

The three-dimensional forms of the shaped premixes are advantageously adapted in their dimensions to the dispensing drawer of commercially available washing or dishwashing machines, so that the shaped bodies can be introduced directly into the corresponding compartments of the dispensing drawer. Alternatively, the shaped bodies according to the invention may of course also be directly introduced into the washing machine drum or dishwasher tank, optionally using dosing aids.

Shaped bodies in virtually any easy-to-handle shape can be produced in accordance with the invention, i.e. for example in the form of a slab or bar, cube, square or corresponding three-dimensional element with flat sides and, in particular, cylindrical forms of circular or oval cross-section. This last embodiment encompasses the supply form of an actual tablet up to and including compact cylinders with a height-to-diameter ratio of more than 1. Other preferred geometric forms which can advantageously be produced by one of the shaping processes mentioned above include, in particular, concave, convex, biconcave, biconvex, cubic, tetragonal, orthorhombic, cylindrical, spherical, cylinder-segment-like, disk-shaped, tetrahedral, dodecahedral, octahedral, conical, pyramidal, ellipsoidal, pentagonal-, heptagonal- and hexagonal-prismatic and rhombohedral forms. Completely irregular bases, such as arrow and animal shapes, trees, clouds etc. can also be produced by the shaping process. If the shaped body has corners and edges, they are preferably rounded off. As an additional optical differentiation, an embodiment with rounded-off corners and bevelled ("chamfered") edges is preferred.

In another preferred embodiment, therefore, the present invention relates to a process for the production of single-phase or multiphase detergent shaped bodies, characterized in that the shaping process is a tabletting and/or extrusion and/or roller compacting and/or solidification and/or sintering and/or crystallization process, but especially a tabletting process.

According to the foregoing, the tabletting of the detergent premix is a preferred shaping process in the context of the present invention. The tablets produced by this process may be both single-phase and multiphase tablets, the concept of the multiphase tablet encompassing, for example, sandwich tablets, dry-coated tablets and bull's-eye tablets. According to the present invention, however, single-phase or multiphase tablets with a cavity in their upper and/or lower faces (cavity tablets) are particularly preferred. As already described for the shaped body, the shape of the cavity may also be freely selected, preferred tablets being characterized in that at least one cavity may assume a concave, convex, cubic, tetragonal, orthorhombic, cylindrical, spherical, cylinder-segment-like, disk-shaped, tetrahedral, dodecahedral, octahedral, conical, pyramidal, ellipsoidal, pentagonal-, heptagonal- and hexagonal-prismatic and rhombohedral form. The cavity may also assume completely irregular shapes, such as arrow or animal shapes, trees, clouds, etc. As with the shaped bodies, cavities with rounded-off corners and edges or rounded-off corners and chamfered edges are preferred. In two-phase or multiphase shaped bodies, the described cavity is not necessarily limited to the three-dimensional volume of one of the outer phases and, in special embodiments, may even extend through one or more phase boundaries into one or more other phases.

Accordingly, in another preferred embodiment, the present invention relates to a process in which the shaped body has a cavity. The size of the cavity by comparison with the shaped body as a whole is determined by the application envisaged for the shaped body. The size of the cavity can vary according to whether and with which substances in which aggregate states the cavity is to be filled. Irrespective of the intended application, preferred detergent tablets are characterized in that the ratio by volume of the basic tablet to the cavity volume is in the range from 1:1 to 100:1, preferably in the range from 2:1 to 80:1, more preferably in the range from 3:1 to 50:1 and most preferably in the range from 4:1 to 30:1.

Similar observations may be made on the contributions made by the basic tablet and the cavity opening to the total surface of the detergent tablet. In preferred detergent tablets, the surface of the cavity opening makes up 1 to 25%, preferably 2 to 20%, more preferably 3 to 15% and most preferably 4 to 10% of the total surface of the tablet.

If, for example, the tablet as a whole has dimensions of 20×20×40 mm and, hence, a total surface area of 40 cm$^2$, preferred cavities have a surface area of 0.4 to 10 cm$^2$, preferably 0.8 to 8 cm$^2$, more preferably 1.2 to 6 cm$^2$ and most preferably 1.6 to 4 cm$^2$.

With regard to the treatment of a shaped detergent premix with a perfume and/or a perfume-containing active-substance mixture, a process according to the invention is not confined to a particular part of the surface of that shaped body. The entire surface of the shaped body may also be treated with a perfume or perfume-containing active-substance mixture. However, a preferred process according to the invention is characterized in that the shaped body is treated with the perfume(s) and/or the perfume-containing active-substance mixture(s) over the cavity area. In the context of the invention, treatment of the shaped body over the cavity area is understood to mean a treatment in which at least 75% by weight, preferably at least 85% by weight and more preferably at least 95% by weight of the perfume and/or perfume-containing active-substance mixture applied is applied to the cavity area.

The process according to the invention is also not limited in any way in the choice of the method for applying the perfume(s) and/or the perfume-containing active-substance mixture(s) to the shaped body. Thus, application may be carried out, for example, by dipping, spraying or rolling around in a drum coater or coating pan or by a combination of these methods. Both solutions and melts of the perfumes and perfume-containing active-substance mixtures may be processed. According to the invention, however, application of the perfume and/or the perfume-containing active-substance mixture by spraying is preferred because it is a simpler process to carry out and achieves higher throughputs. Two techniques may be used for spraying. In discontinuous coating, small portions are sprayed on and optionally dried in an air stream whereas, in the continuous process, the perfumes and/or perfume-containing active-substance mixtures are sprayed on without interruption and optionally dried by air blown on at the same time. Spraying on itself may be carried out with one-component or high-pressure spray nozzles, two-component spray nozzles or three-component spray nozzles. For spraying with one-component spray nozzles, a high melt pressure (5–15 MPa) has to be applied whereas spraying in two-component nozzles is carried out with compressed air (at 0.15–0.3 MPa). Spraying with two-component nozzles is more favorable from the perspective of possible nozzle blockages, but more expensive because of the high consumption of compressed air. A modern further development is the three-component nozzle which, besides the compressed air for spraying, has another air supply system intended to prevent blockages and the formation of droplets on the nozzle. To achieve a high throughput and to reduce process costs, the use of one-component spray nozzles for subsequently applying perfume or perfume-containing active-substance mixtures to shaped bodies is preferred for the process according to the invention, one-component nozzles delivering doses at a rate of more than 500 per minute, preferably at a rate of more than 700 per minute and more particularly at a rate of more than 900 per minute.

As mentioned at the beginning, the process according to the invention is also suitable for the subsequent perfuming of multiphase detergent shaped bodies. Multiphase detergent shaped bodies may be used to process mutually incompatible detergent ingredients in spatially separate phases or to guarantee the timed release of active substances by selectively influencing the solubilities of those phases. For visualization purposes, the individual tablet phases are generally colored. According to the invention, it has been found that colored tablet phases, i.e. for example tablet phases which contain one or more of the dyes mentioned hereinafter, can show visible surface stains ("fatty stains") in consequence of subsequent perfuming. No such observations were made for dye-free tablet phases. In a preferred embodiment of the process according to the invention, therefore, the subsequent perfuming is carried out on dye-free shaped bodies or phases thereof.

In another preferred embodiment of the process according to the invention, the shaped body is provided at least partly with a sealing layer after application of the perfume and/or a perfume-containing active-substance mixture. Particularly suitable sealing materials for the purposes of the present invention are the above-mentioned waxes, paraffins, polyalkylene glycols and/or water-soluble polymers, the use of polyalkylene glycol(s), especially polyethylene glycol(s), being particularly preferred for the purposes of the present invention. A detailed description of these substances can be found in the foregoing.

The sealing of perfumed detergent shaped bodies according to the invention has the advantage of preventing unwanted premature volatilization of the perfume(s), particularly in cases where a shaped body is subsequently perfumed with a perfume or a perfume-containing active-substance mixture based on nonaqueous solvent. In addition, sealing enables the original single-phase or multiphase detergent shaped body to be subsequently bonded to another single-phase or multiphase detergent shaped body by the sealing material. A comparable procedure is facilitated by the use of active-substance mixtures based on softenable or meltable substances, such as waxes, paraffins or polyalkylene glycols. In another preferred embodiment, therefore, the present invention relates to a process which is characterized in that another single-phase or multiphase detergent shaped body is applied and adhesively bonded to the perfume-containing active-substance mixture and/or the sealing material. The present invention also relates to the use of mixtures containing polyalkylene glycol(s) and perfume as bonding agents.

Besides surfactants and builders, preferred single-phase or multiphase detergent shaped bodies produced by the process according to the invention optionally contain other detersive substances, preferably from the group of builders, cobuilders, surfactants, bleaching agents, bleach activators, enzymes, dyes, electrolytes, pH adjusters, fluorescent whitening agents, dyes, hydrotropes, foam inhibitors, silicone oils, redeposition inhibitors, optical brighteners, discoloration inhibitors, shrinkage inhibitors, creaseproofing additives, dye transfer inhibitors, antimicrobial agents, germicides, fungicides, antioxidants, corrosion inhibitors, antistatic agents, ironing aids, waterproofing and impregnating agents, swelling agents and nonslip finishes and/or UV absorbers. Some of these ingredients are described in more detail hereinafter.

Builders

According to the invention, any of the builders typically used in detergents and cleaning compositions, more particularly silicates, carbonates, organic cobuilders and even the phosphates, may be incorporated in the detergents and cleaning compositions.

Suitable crystalline layered sodium silicates correspond to the general formula $NaMSi_xO_{2x+1} \cdot y\ H_2O$, where M is sodium or hydrogen, x is a number of 1.9 to 4 and y is a number of 0 to 20, preferred values for x being 2, 3 or 4. Preferred crystalline layered silicates corresponding to the above formula are those in which M is sodium and x assumes the value 2 or 3. Both β- and δ-sodium disilicates $Na_2Si_2O_5 \cdot y\ H_2O$ are particularly preferred.

Other useful builders are amorphous sodium silicates with a modulus ($Na_2O:SiO_2$ ratio) of 1:2 to 1:3.3, preferably 1:2 to 1:2.8 and more preferably 1:2 to 1:2.6 which dissolve with delay and exhibit multiple wash cycle properties. The delay in dissolution in relation to conventional amorphous sodium silicates can have been obtained in various ways, for example by surface treatment, compounding/compacting or by overdrying. In the context of the invention, the term "amorphous" is also understood to encompass "X-ray amorphous". In other words, the silicates do not produce any of the sharp X-ray reflexes typical of crystalline substances in X-ray diffraction experiments, but at best one or more maxima of the scattered X-radiation which have a width of several degrees of the diffraction angle. However, particularly good builder properties may even be achieved where the silicate particles produce crooked or even sharp diffraction maxima in electron diffraction experiments. This may be interpreted to mean that the products have microcrystalline regions between 10 and a few hundred nm in size, values of up to at most 50 nm and, more particularly, up to at most 20 nm being preferred. Compacted amorphous silicates, compounded amorphous silicates and overdried X-ray-amorphous silicates are particularly preferred.

The compositions may contain both the monoalkali metal salts and the dialkali metal salts of carbonic acid and sesquicarbonates as carbonates. Preferred alkali metal ions are sodium and/or potassium ions. In one preferred embodiment, the carbonate and/or bicarbonate may be at least partly separately or subsequently incorporated as another component. Compounds of, for example, carbonate, silicate and optionally other auxiliaries such as, for example, anionic surfactants or other, more particularly organic, builders may also be present as separate components in the final compositions.

The generally known phosphates may of course also be used as builders providing their use should not be avoided on ecological grounds. Among the large number of commercially available phosphates, alkali metal phosphates have the greatest importance in the detergent industry, pentasodium triphosphate and pentapotassium triphosphate (sodium and potassium tripolyphosphate) being particularly preferred.

"Alkali metal phosphates" is the collective term for the alkali metal (more particularly sodium and potassium) salts of the various phosphoric acids, including metaphosphoric acids $(HPO_3)_n$ and orthophosphoric acid $(H_3PO_4)$ and representatives of higher molecular weight. The phosphates combine several advantages: they act as alkalinity sources, prevent lime deposits on machine parts and lime incrustations in fabrics and, in addition, contribute towards the cleaning effect.

Sodium dihydrogen phosphate ($NaH_2PO_4$) exists as the dihydrate (density 1.91 gcm$^{-3}$, melting point 60°) and as the monohydrate (density 2.04 gcm$^{-3}$). Both salts are white readily water-soluble powders which, on heating, lose the water of crystallization and, at 200° C. are converted into the weakly acidic diphosphate (disodium hydrogen diphosphate, $Na_2H_2P_2O_7$) and, at higher temperatures, into sodium trimetaphosphate ($Na_3P_3O_9$) and Maddrell's salt (see below). $NaH_2PO_4$ shows an acidic reaction. It is formed by adjusting phosphoric acid with sodium hydroxide to a pH value of 4.5 and spraying the resulting "mash". Potassium dihydrogen phosphate (primary or monobasic potassium phosphate, potassium biphosphate, KDP), $KH_2PO_4$, is a white salt with a density of 2.33 gcm$^{-3}$, has a melting point of 253° [decomposition with formation of potassium polyphosphate $(KPO_3)_x$] and is readily soluble in water.

Disodium hydrogen phosphate (secondary sodium phosphate), $Na_2HPO_4$, is a colorless, readily water-soluble crystalline salt. It exists in water-free form and with 2 mol (density 2.066 gcm$^{-3}$, water loss at 95°), 7 mol (density 1.68 gcm$^{-3}$, melting point 48° with loss of 5 H$_2$O) and 12 mol of water (density 1.52 gcm$^{-3}$, melting point 35° with loss of 5 H$_2$O), becomes water-free at 100° and, on fairly intensive heating, is converted into the diphosphate Na$_4$P$_2$O$_7$. Disodium hydrogen phosphate is prepared by neutralization of phosphoric acid with soda solution using phenolphthalein as indicator. Dipotassium hydrogen phosphate (secondary or dibasic potassium phosphate), K$_2$HPO$_4$, is an amorphous white salt which is readily soluble in water.

Trisodium phosphate, tertiary sodium phosphate, Na$_3$PO$_4$, consists of colorless crystals which have a density of 1.62 gcm$^{-3}$ and a melting point of 73–76° C. (decomposition) as the dodecahydrate, a melting point of 100° C. as the decahydrate (corresponding to 19–20% P$_2$O$_5$) and a density of 2.536 gcm$^{-3}$ in water-free form (corresponding to 39–40% P$_2$O$_5$). Trisodium phosphate is readily soluble in water through an alkaline reaction and is prepared by concentrating a solution of exactly 1 mole of disodium phosphate and 1 mole of NaOH by evaporation. Tripotassium phosphate (tertiary or tribasic potassium phosphate), K$_3$PO$_4$, is a white deliquescent granular powder with a density of 2.56 gcm$^{-3}$, has a melting point of 1340° and is readily soluble in water through an alkaline reaction. It is formed, for example, when Thomas slag is heated with coal and potassium sulfate. Despite their higher price, the more readily soluble and therefore highly effective potassium phosphates are often preferred to corresponding sodium compounds in the detergent industry.

Tetrasodium diphosphate (sodium pyrophosphate), Na$_4$P$_2$O$_7$, exists in water-free form (density 2.534 gcm$^{-3}$, melting point 988°, a figure of 880° has also been mentioned) and as the decahydrate (density 1.815–1.836 gcm$^{-3}$, melting point 94° with loss of water). Both substances are colorless crystals which dissolve in water through an alkaline reaction. Na$_4$P$_2$O$_7$ is formed when disodium phosphate is heated to >200° or by reacting phosphoric acid with soda in a stoichiometric ratio and spray-drying the solution. The decahydrate complexes heavy metal salts and hardness salts and, hence, reduces the hardness of water. Potassium diphosphate (potassium pyrophosphate), K$_4$P$_2$O$_7$, exists in the form of the trihydrate and is a colorless hygroscopic powder with a density of 2.33 gcm$^{-3}$ which is soluble in water, the pH value of a 1% solution at 25° being 10.4.

Relatively high molecular weight sodium and potassium phosphates are formed by condensation of NaH$_2$PO$_4$ or KH$_2$PO$_4$. They may be divided into cyclic types, namely the sodium and potassium metaphosphates, and chain types, the sodium and potassium polyphosphates. The chain types in particular are known by various different names: fused or calcined phosphates, Graham's salt, Kurrol's salt and Maddrell's salt. All higher sodium and potassium phosphates are known collectively as condensed phosphates.

The industrially important pentasodium triphosphate, Na$_5$P$_3$O$_{10}$ (sodium tripolyphosphate), is a non-hygroscopic white water-soluble salt which crystallizes without water or with 6 H$_2$O and which has the general formula NaO—[P(O)(ONa)—O]$_n$—Na where n=3. Around 17 g of the salt free from water of crystallization dissolve in 100 g of water at room temperature, around 20 g at 60° and around 32 g at 100°. After heating of the solution for 2 hours to 100°, around 8% orthophosphate and 15% diphosphate are formed by hydrolysis. In the preparation of pentasodium triphosphate, phosphoric acid is reacted with soda solution or sodium hydroxide in a stoichiometric ratio and the solution is spray-dried. Similarly to Graham's salt and sodium diphosphate, pentasodium triphosphate dissolves many insoluble metal compounds (including lime soaps, etc.).

Pentapotassium triphosphate, K$_5$P$_3$O$_{10}$ (potassium tripolyphosphate), is marketed for example in the form of a 50% by weight solution (>23% P$_2$O$_5$, 25% K$_2$O). The potassium polyphosphates are widely used in the detergent industry. Sodium potassium tripolyphosphates, which may also be used in accordance with the invention, also exist. They are formed for example when sodium trimetaphosphate is hydrolyzed with KOH:

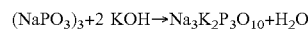

(NaPO$_3$)$_3$+2 KOH→Na$_3$K$_2$P$_3$O$_{10}$+H$_2$O

According to the invention, they may be used in exactly the same way as sodium tripolyphosphate, potassium tripolyphosphate or mixtures thereof. Mixtures of sodium tripolyphosphate and sodium potassium tripolyphosphate or mixtures of potassium tripolyphosphate and sodium potassium tripolyphosphate or mixtures of sodium tripolyphosphate and potassium tripolyphosphate and sodium potassium tripolyphosphate may also be used in accordance with the invention.

According to the invention, preferred detergents and cleaning compositions contain no sodium and/or potassium hydroxide.

Cobuilders

Organic cobuilders which may be used in the dishwasher detergents according to the invention include, in particular, polycarboxylates/polycarboxylic acids, polymeric polycarboxylates, aspartic acid, polyacetals, dextrins, other organic cobuilders (see below) and phosphonates. These classes of substances are described in the following.

Useful organic builders are, for example, the polycarboxylic acids usable in the form of their sodium salts, polycarboxylic acids in this context being understood to be carboxylic acids which carry more than one acid function. These include, for example, citric acid, adipic acid, succinic acid, glutaric acid, malic acid, tartaric acid, maleic acid, fumaric acid, sugar acids, aminocarboxylic acids, nitrilotriacetic acid (NTA), providing its use is not ecologically unsafe, and mixtures thereof. Preferred salts are the salts of the polycarboxylic acids, such as citric acid, adipic acid, succinic acid, glutaric acid, tartaric acid, sugar acids and mixtures thereof.

The acids per se may also be used. Besides their building effect, the acids also typically have the property of an acidifying component and, hence, also serve to establish a relatively low and mild pH value in detergents or cleaners. Citric acid, succinic acid, glutaric acid, adipic acid, gluconic acid and mixtures thereof are particularly mentioned in this regard.

Other suitable builders are polymeric polycarboxylates, i.e. for example the alkali metal salts of polyacrylic or polymethacrylic acid, for example those with a relative molecular weight of 500 to 70,000 g/mol.

Organic cobuilders which may be used in the dishwasher detergents according to the invention include, in particular, polycarboxylates/polycarboxylic acids, polymeric polycarboxylates, aspartic acid, polyacetals, dextrins, other organic cobuilders (see below) and phosphonates. These classes of substances are described in the following.

Useful organic builders are, for example, the polycarboxylic acids usable in the form of their sodium salts, polycarboxylic acids in this context being understood to be carboxylic acids which carry more than one acid function. These include, for example, citric acid, adipic acid, succinic acid, glutaric acid, malic acid, tartaric acid, maleic acid, fumaric acid, sugar acids, aminocarboxylic acids, nitrilotriacetic acid (NTA), providing its use is not ecologically unsafe, and mixtures thereof. Preferred salts are the salts of the polycarboxylic acids, such as citric acid, adipic acid, succinic acid, glutaric acid, tartaric acid, sugar acids and mixtures thereof.

The acids per se may also be used. Besides their building effect, the acids also typically have the property of an acidifying component and, hence, also serve to establish a relatively low and mild pH value in detergents or cleaners. Citric acid, succinic acid, glutaric acid, adipic acid, gluconic acid and mixtures thereof are particularly mentioned in this regard.

Other suitable builders are polymeric polycarboxylates, i.e. for example the alkali metal salts of polyacrylic or polymethacrylic acid, for example those with a relative molecular weight of 500 to 70,000 g/mol.

The molecular weights mentioned in this specification for polymeric polycarboxylates are weight-average molecular weights $M_w$ of the particular acid form which, basically, were determined by gel permeation chromatography (GPC) using a UV detector. The measurement was carried out against an external polyacrylic acid standard which provides realistic molecular weight values by virtue of its structural similarity to the polymers investigated. These values differ distinctly from the molecular weights measured against polystyrene sulfonic acids as standard. The molecular weights measured against polystyrene sulfonic acids are generally higher than the molecular weights mentioned in this specification.

Particularly suitable polymers are polyacrylates which preferably have a molecular weight of 1,000 to 20,000 g/mol. By virtue of their superior solubility, preferred representatives of this group are the short-chain polyacrylates which have molecular weights of 1,000 to 10,000 g/mol and, more particularly, 1,200 to 4,000 g/mol.

In a particularly preferred embodiment, the compositions produced by the process according to the invention contain both polyacrylates and copolymers of unsaturated carboxylic acids, monomers containing sulfonic acid groups and optionally other ionic or nonionic monomers. The copolymers containing sulfonic acid groups are described in detail in the following.

However, cleaning compositions which, as so-called "3-in-1" products, combine the conventional detergents, rinse agents and a salt replacement function can also be provided by the process according to the invention. Detergents and cleaning compositions produced in accordance with the invention which additionally contain i) unsaturated carboxylic acids, ii) monomers containing sulfonic acid groups and iii) optionally other ionic or nonionic monomers are preferred for this purpose.

The effect of these copolymers, for example in machine dishwashing, is that tableware treated with such compositions becomes distinctly cleaner in subsequent cleaning processes than tableware which has been cleaned with compositions that do not contain these copolymers. An additional positive effect is that the drying time of tableware treated with such cleaning compositions is shortened, i.e. the consumer is able to unload the machine and reuse the tableware sooner on completion of the dishwashing program.

The expression "drying time" in the context of the present invention is generally intended to have the accepted meaning, i.e. the time elapsing before tableware surfaces treated in a dishwasher are dry, but more especially the time elapsing before 90% of a surface treated with a detergent or rinse agent in concentrated or dilute form is dry.

According to the invention, preferred monomers are unsaturated carboxylic acids corresponding to formula (I):

in which $R^1$ to $R^3$ independently of one another represent —H, —$CH_3$, a linear or branched, saturated alkyl group containing 2 to 12 carbon atoms, a linear or branched, mono- or polyunsaturated alkenyl group containing 2 to 12 carbon atoms, —$NH_2$—, —OH— or —COOH-substituted alkyl or alkenyl groups as defined above or —COOH or —$COOR^4$, where $R^4$ is a saturated or unsaturated, linear or branched hydrocarbon radical containing 1 to 12 carbon atoms.

Among the unsaturated carboxylic acids corresponding to formula (I), acrylic acid ($R^1$=$R^2$=$R^3$=H), methacrylic acid ($R^1$=$R^2$=H; $R^3$=$CH_3$) and/or maleic acid ($R^1$=COOH; $R^2$=$R^3$=H) are particularly preferred.

Preferred monomers containing sulfonic acid groups correspond to formula (II):

in which $R^5$ to $R^7$ independently of one another represent —H, —$CH_3$, a linear or branched, saturated alkyl group containing 2 to 12 carbon atoms, a linear or branched, mono- or polyunsaturated alkenyl group containing 2 to 12 carbon atoms, —$NH_2$—, —OH— or —COOH-substituted alkyl or alkenyl groups as defined above or —COOH or —$COOR^4$, where $R^4$ is a saturated or unsaturated, linear or branched hydrocarbon radical containing 1 to 12 carbon atoms, and X is an optionally present spacer group selected from —$(CH_2)_n$— with n=0 to 4, —COO—$(CH_2)_k$— with k=1 to 6, —C(O)—NH—$C(CH_3)_2$— and —C(O)—NH—CH($CH_2CH_3$)—.

Among these monomers, those corresponding to formulae (IIa), (IIb) and/or (IIc):

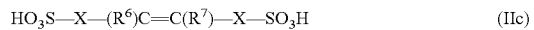

in which $R^6$ and $R^7$ independently of one another are selected from —H, —$CH_3$, —$CH_2CH_3$, —$CH_2CH_2CH_3$, —$CH(CH_3)_2$ and X is an optionally present spacer group selected from —$(CH_2)_n$— with n=0 to 4, —COO—$(CH_2)_k$— with k=1 to 6, —C(O)—NH—$C(CH_3)_2$— and —C(O)—NH—CH($CH_2CH_3$)—, are preferred Particularly preferred monomers containing sulfonic acid groups are 1-acrylamido-1-propanesulfonic acid (X=—C(O)NH—CH($CH_2CH_3$) in formula (IIa)), 2-acrylamido-2-propanesulfonic acid (X=—C(O)NH—$C(CH_3)_2$ in formula (IIa)), 2-acrylamido-2-methyl-1-propanesulfonic acid (X=—C(O)NH—CH($CH_3$)$CH_2$— in formula IIa)), 2-methacrylamido-2-methyl-1-propanesulfonic acid (X=—C(O)NH—H($CH_3$)$CH_2$— in formula (IIb)), 3-methacrylamido-2-hydroxypropanesulfonic acid (X=—C(O)NH—$CH_2$OH(OH)$CH_2$— in formula (IIb)), allyl sulfonic acid (X=$CH_2$ in formula (IIa)), methallylsulfonic acid (X=$CH_2$ in formula (IIb)), allyloxybenzenesulfonic acid (X=—$CH_2$—O—$C_6H_4$— in formula (IIa)), methallyloxybenzenesulfonic acid (X=—$CH_2$—O—$C_6H_4$— in formula (IIb)), 2-hydroxy-3-(2-propenyloxy)propanesulfonic acid, 2-methyl-2-propene-1-sulfonic acid (X=$CH_2$ in formula (IIb)), styrenesulfonic acid (X=$C_6H_4$ in formula (IIa)), vinylsulfonic acid (X not present in formula (IIa)), 3-sulfopropylacrylate (X=—C(O)NH—

CH$_2$CH$_2$CH$_2$— in formula (IIa)), 3-sulfopropylmethacrylate (X=—C(O)NH—CH$_2$CH$_2$CH$_2$— in formula (IIb)), sulfomethacrylamide (X=—C(O)NH— in formula (IIb)), sulfomethylmethacrylamide (X=—C(O)NH—CH$_2$— in formula (IIb)) and water-soluble salts of the acids mentioned.

Suitable other ionic or nonionic monomers are, in particular, ethylenically unsaturated compounds. The polymers used in accordance with the invention preferably contain less than 20% by weight, based on polymer, of monomers belonging to group iii). Particularly preferred polymers consist solely of monomers belonging to groups i) and ii).

To sum up, particular preference is attributed to copolymers of i) unsaturated carboxylic acids corresponding to formula (I):

$$R^1(R^2)C=C(R^3)COOH \qquad (I)$$

in which R$^1$ to R$^3$ independently of one another represent —H, —CH$_3$, a linear or branched, saturated alkyl group containing 2 to 12 carbon atoms, a linear or branched, mono- or polyunsaturated alkenyl group containing 2 to 12 carbon atoms, —NH$_2$—, —OH— or —COOH-substituted alkyl or alkenyl groups as defined above or —COOH or —COOR$^4$, where R$^4$ is a saturated or unsaturated, linear or branched hydrocarbon radical containing 1 to 12 carbon atoms, ii) monomers containing sulfonic acid groups corresponding to formula (II):

$$R^5(R^6)C=C(R^7)—X—SO_3H \qquad (II)$$

in which R$^5$ to R$^7$ independently of one another represent —H, —CH$_3$, a linear or branched, saturated alkyl group containing 2 to 12 carbon atoms, a linear or branched, mono- or polyunsaturated alkenyl group containing 2 to 12 carbon atoms, —NH$_2$—, —OH— or —COOH-substituted alkyl or alkenyl groups as defined above or —COOH or —COOR$^4$, where R$^4$ is a saturated or unsaturated, linear or branched hydrocarbon radical containing 1 to 12 carbon atoms, and X is an optionally present spacer group selected from —(CH$_2$)$_n$— with n=0 to 4, —COO—(CH$_2$)$_k$— with k=1 to 6, —C(O)—NH—C(CH$_3$)$_2$— and —C(O)—NH—CH(CH$_2$CH$_3$)—, iii) optionally other ionic or nonionic monomers.

Particularly preferred copolymers consist of i) one or more unsaturated carboxylic acids from the group consisting of acrylic acid, methacrylic acid and/or maleic acid, ii) one or more monomers containing sulfonic acid groups corresponding to formulae (IIa), (IIb) and/or (IIc):

$$H_2C=CH—X—SO_3H \qquad (IIa)$$

$$H_2C=C(CH_3)—X—SO_3H \qquad (IIb)$$

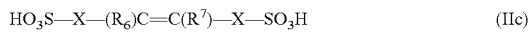

$$HO_3S—X—(R_6)C=C(R^7)—X—SO_3H \qquad (IIc)$$

in which R$^6$ and R$^7$ independently of one another are selected from —H, —CH$_3$, —CH$_2$CH$_3$, —CH$_2$CH$_2$CH$_3$, —CH(CH$_3$)$_2$ and X is an optionally present spacer group selected from —(CH$_2$)$_n$— with n=0 to 4, —COO—(CH$_2$)$_k$— with k=1 to 6, —C(O)—NH—C(CH$_3$)$_2$— and —C(O)—NH—CH(CH$_2$CH$_3$)—, iii) optionally other ionic or nonionic monomers.

The copolymers preferably present in the compositions may contain the monomers belonging to groups i) and ii) and optionally iii) in varying quantities, all representatives of group i) being combinable with all representatives of group ii) and all representatives of group iii). Particularly preferred polymers contain certain structural units which are described in the following.

For example, preferred compositions produced in accordance with the invention are characterized in that they contain one or more copolymers containing structural units corresponding to formula (III):

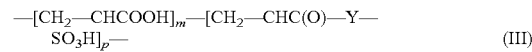

$$—[CH_2—CHCOOH]_m—[CH_2—CHC(O)—Y—SO_3H]_p— \qquad (III)$$

in which m and p are whole natural numbers of 1 to 2,000 and Y is a spacer group selected from substituted or unsubstituted aliphatic, aromatic or araliphatic hydrocarbon radicals containing 1 to 24 carbon atoms, spacer groups in which Y represents —O—(CH$_2$)$_n$— with n=0 to 4, —O—(C$_6$H$_4$)—, —NH—C(CH$_3$)$_2$— or —NH—CH(CH$_2$CH$_3$)— being preferred.

These polymers are produced by copolymerization of acrylic acid with an acrylic acid derivative containing sulfonic acid groups. If the acrylic acid derivative containing sulfonic acid groups is copolymerized with methacrylic acid, another polymer is obtained which is also preferably used in the compositions according to the invention and which is characterized in that the compositions contain one or more copolymers which contain structural units corresponding to formula (IV):

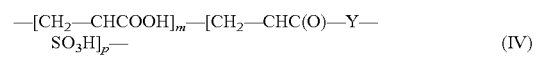

$$—[CH_2—CHCOOH]_m—[CH_2—CHC(O)—Y—SO_3H]_p— \qquad (IV)$$

in which m and p are whole natural numbers of 1 to 2,000 and Y is a spacer group selected from substituted or unsubstituted aliphatic, aromatic or araliphatic hydrocarbon radicals containing 1 to 24 carbon atoms, spacer groups in which Y represents —O—(CH$_2$)$_n$— with n=0 to 4, —O—(C$_6$H$_4$)—, —NH—C(CH$_3$)$_2$— or —NH—CH(CH$_2$CH$_3$)— being preferred.

Entirely analogously, acrylic acid and/or methacrylic acid may also be copolymerized with methacrylic acid derivatives containing sulfonic acid groups, so that the structural units in the molecule are changed. Thus, compositions produced in accordance with the invention which contain one or more copolymers containing structural units corresponding to formula (V):

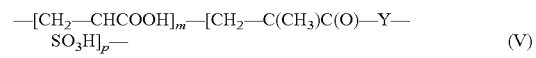

$$—[CH_2—CHCOOH]_m—[CH_2—C(CH_3)C(O)—Y—SO_3H]_p— \qquad (V)$$

in which m and p are whole natural numbers of 1 to 2,000 and Y is a spacer group selected from substituted or unsubstituted aliphatic, aromatic or araliphatic hydrocarbon radicals containing 1 to 24 carbon atoms, spacer groups in which Y represents —O—(CH$_2$)$_n$— with n=0 to 4, —O—(C$_6$H$_4$)—, —NH—C(CH$_3$)$_2$— or —NH—CH(CH$_2$CH$_3$)— being preferred, represent another preferred embodiment of the invention, as do compositions which are characterized in that they contain one or more copolymers containing structural units corresponding to formula (VI):

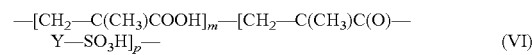

$$—[CH_2—C(CH_3)COOH]_m—[CH_2—C(CH_3)C(O)—Y—SO_3H]_p— \qquad (VI)$$

in which m and p are whole natural numbers of 1 to 2,000 and Y is a spacer group selected from substituted or unsubstituted aliphatic, aromatic or araliphatic hydrocarbon radicals containing 1 to 24 carbon atoms, spacer groups in which Y represents —O—(CH$_2$)$_n$— with n=0 to 4, —O—(C$_6$H$_4$)—, —NH—C(CH$_3$)$_2$— or —NH—CH(CH$_2$CH$_3$)— being preferred.

Maleic acid may also be used as a particularly preferred group i) monomer instead of or in addition to acrylic acid and/or methacrylic acid. In this way, it is possible to arrive at preferred compositions according to the invention which are characterized in that they contain one or more copolymers which contain structural units corresponding to formula (VII):

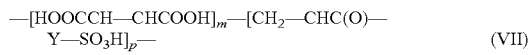
$$—[HOOCCH—CHCOOH]_m—[CH_2—CHC(O)—Y—SO_3H]_p— \quad\quad (VII)$$

in which m and p are whole natural numbers of 1 to 2,000 and Y is a spacer group selected from substituted or unsubstituted aliphatic, aromatic or araliphatic hydrocarbon radicals containing 1 to 24 carbon atoms, spacer groups in which Y represents —O—(CH$_2$)$_n$— with n=0 to 4, —O—(C$_6$H$_4$)—, —NH—C(CH$_3$)$_2$— or —NH—CH(CH$_2$CH$_3$)— being preferred, and at compositions which are characterized in that they contain one or more copolymers which contain structural units corresponding to formula (VIII):

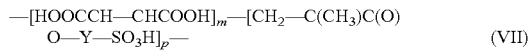
$$—[HOOCCH—CHCOOH]_m—[CH_2—C(CH_3)C(O)O—Y—SO_3H]_p— \quad\quad (VII)$$

in which m and p are whole natural numbers of 1 to 2,000 and Y is a spacer group selected from substituted or unsubstituted aliphatic, aromatic or araliphatic hydrocarbon radicals containing 1 to 24 carbon atoms, spacer groups in which Y represents —O—(CH$_2$)$_n$— with n=0 to 4, —O—(C$_6$H$_4$)—, —NH—C(CH$_3$)$_2$— or —NH—CH(CH$_2$CH$_3$)— being preferred.

To sum up, preferred cleaning compositions produced by the process according to the invention are those which contain as ingredient b) one or more copolymers containing structural units corresponding to formulae (III) and/or (IV) and/or (V) and/or (VI) and/or (VII) and/or (VIII):

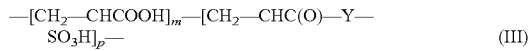
$$—[CH_2—CHCOOH]_m—[CH_2—CHC(O)—Y—SO_3H]_p— \quad\quad (III)$$

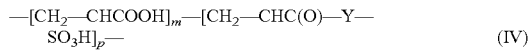
$$—[CH_2—CHCOOH]_m—[CH_2—CHC(O)—Y—SO_3H]_p— \quad\quad (IV)$$

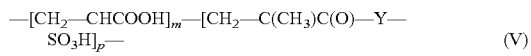
$$—[CH_2—CHCOOH]_m—[CH_2—C(CH_3)C(O)—Y—SO_3H]_p— \quad\quad (V)$$

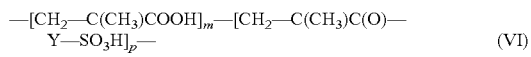
$$—[CH_2—C(CH_3)COOH]_m—[CH_2—C(CH_3)C(O)—Y—SO_3H]_p— \quad\quad (VI)$$

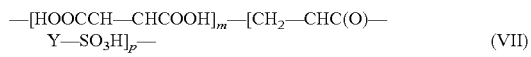
$$—[HOOCCH—CHCOOH]_m—[CH_2—CHC(O)—Y—SO_3H]_p— \quad\quad (VII)$$

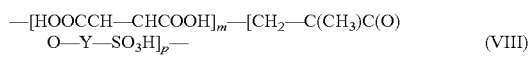
$$—[HOOCCH—CHCOOH]_m—[CH_2—C(CH_3)C(O)O—Y—SO_3H]_p— \quad\quad (VIII)$$

in which m and p are whole natural numbers of 1 to 2,000 and Y is a spacer group selected from substituted or unsubstituted aliphatic, aromatic or araliphatic hydrocarbon radicals containing 1 to 24 carbon atoms, spacer groups in which Y represents —O—(CH$_2$)$_n$— with n=0 to 4, —O—(C$_6$H$_4$)—, —NH—C(CH$_3$)$_2$— or —NH—CH(CH$_2$CH$_3$)— being preferred.

The sulfonic acid groups may be present in the polymers completely or partly in neutralized form, i.e. the acidic hydrogen atom of the sulfonic acid groups being replaceable by metal ions, preferably alkali metal ions and more particularly sodium ions, in some or all of the sulfonic acid groups. Corresponding compositions which are characterized in that the sulfonic acid groups in the copolymer are present in partly or fully neutralized form represent a preferred embodiment of the invention.

In the case of copolymers which only contain group i) and group ii) monomers, the monomer distribution in the copolymers used in the preferred compositions is preferably 5 to 95% by weight i) or ii) and more preferably 50 to 90% by weight group i) monomer and 10 to 50% by weight group ii) monomer, based in each case on the polymer.

Particularly preferred terpolymers contain 20 to 85% by weight group i) monomer, 10 to 60% by weight group ii) monomer and 5 to 30% by weight group iii) monomer.

The molecular weight of the polymers used in the preferred compositions may be varied in order to adapt the properties of the polymers to the particular application envisaged. Preferred detergents and/or cleaning compositions are characterized in that the copolymers have molecular weights of 2,000 to 200,000 gmol$^{-1}$, preferably in the range from 4,000 to 25,000 gmol$^{-1}$ and more particularly in the range from 5,000 to 15,000 gmol$^{-1}$.

The content of one or more copolymers in the preferred compositions produced by the process according to the invention may vary according to the application envisaged and the desired product performance, preferred detergents and/or cleaning compositions produced in accordance with the invention, for example dishwasher detergents, being characterized in that they contain the copolymer(s) in quantities of 0.25 to 50% by weight, preferably 0.5 to 35% by weight, more preferably 0.75 to 20% by weight and most preferably 1 to 15% by weight.

As mentioned above, both polyacrylates and the above-described copolymers of unsaturated carboxylic acids, monomers containing sulfonic acid groups and optionally other ionic or nonionic monomers are used in a particularly preferred embodiment of the compositions produced in accordance with the invention. The polyacrylates are described in detail in the foregoing. Combinations of the above-described copolymers containing sulfonic acid groups with low molecular weight polyacrylates, for example with molecular weights of 1,000 to 4,000 dalton, are particularly preferred. Such polyacrylates are commercially available under the names of Sokalan® PA15 and Sokalan® PA25 (BASF).

Also suitable are copolymeric polycarboxylates, particularly those of acrylic acid with methacrylic acid and those of acrylic acid or methacrylic acid with maleic acid. Acrylic acid/maleic acid copolymers containing 50 to 90% by weight of acrylic acid and 50 to 10% by weight of maleic acid have proved to be particularly suitable. Their relative molecular weights, based on the free acids, are generally in the range from 2,000 to 100,000 g/mole, preferably in the range from 20,000 to 90,000 g/mole and more preferably in the range from 30,000 to 80,000 g/mole.

The (co)polymeric polycarboxylates may be used either in powder form or in the form of an aqueous solution. The content of (co)polymeric polycarboxylates in the foams is preferably 0.5 to 20% by weight and more particularly 3 to 10% by weight.

In order to improve solubility in water, the polymers may also contain allyl sulfonic acids such as, for example, allyloxybenzene sulfonic acid and methallyl sulfonic acid as monomer.

Other particularly preferred polymers are biodegradable polymers of more than two different monomer units, for example those which contain salts of acrylic acid and maleic acid and vinyl alcohol or vinyl alcohol derivatives as monomers or those which contain salts of acrylic acid and 2-alkylallyl sulfonic acid and sugar derivatives as monomers.

Other preferred copolymers are those which preferably contain acrolein and acrylic acid/acrylic acid salts or acrolein and vinyl acetate as monomers.

Other preferred builders are polymeric aminodicarboxylic acids, salts or precursors thereof. Polyaspartic acids or salts and derivatives thereof are particularly preferred.

Other suitable builders are polyacetals which may be obtained by reaction of dialdehydes with polyol carboxylic acids containing 5 to 7 carbon atoms and at least three hydroxyl groups. Preferred polyacetals are obtained from dialdehydes, such as glyoxal, glutaraldehyde, terephthalaldehyde and mixtures thereof and from polyol carboxylic acids, such as gluconic acid and/or glucoheptonic acid.

Other suitable organic builders are dextrins, for example oligomers or polymers of carbohydrates which may be obtained by partial hydrolysis of starches. The hydrolysis may be carried out by standard methods, for example acid- or enzyme-catalyzed methods. The end products are preferably hydrolysis products with average molecular weights of 400 to 500,000 g/mol. A polysaccharide with a dextrose equivalent (DE) of 0.5 to 40 and, more particularly, 2 to 30 is preferred, the DE being an accepted measure of the reducing effect of a polysaccharide by comparison with dextrose which has a DE of 100. Both maltodextrins with a DE of 3 to 20 and dry glucose sirups with a DE of 20 to 37 and also so-called yellow dextrins and white dextrins with relatively high molecular weights of 2,000 to 30,000 g/mole may be used.

The oxidized derivatives of such dextrins are their reaction products with oxidizing agents which are capable of oxidizing at least one alcohol function of the saccharide ring to the carboxylic acid function. A product oxidized at $C_6$ of the saccharide ring can be particularly advantageous.

Other suitable co-builders are oxydisuccinates and other derivatives of disuccinates, preferably ethylenediamine disuccinate. Ethylenediamine-N,N'-disuccinate (EDDS) is preferably used in the form of its sodium or magnesium salts. Glycerol disuccinates and glycerol trisuccinates are also preferred in this connection. The quantities used in zeolite-containing and/or silicate-containing formulations are from 3 to 15% by weight.

Other useful organic co-builders are, for example, acetylated hydroxycarboxylic acids and salts thereof which may optionally be present in lactone form and which contain at least 4 carbon atoms, at least one hydroxy group and at most two acid groups.

Another class of substances with co-builder properties are the phosphonates, more particularly hydroxyalkane and aminoalkane phosphonates. Among the hydroxyalkane phosphonates, 1-hydroxyethane-1,1-diphosphonate (HEDP) is particularly important as a co-builder. It is preferably used in the form of the sodium salt, the disodium salt showing a neutral reaction and the tetrasodium salt an alkaline reaction (pH 9). Preferred aminoalkane phosphonates are ethylenediamine tetramethylene phosphonate (EDTMP), diethylenetriamine pentamethylenephosphonate (DTPMP) and higher homologs thereof. They are preferably used in the form of the neutrally reacting sodium salts, for example as the hexasodium salt of EDTMP or as the hepta- and octasodium salts of DTPMP. Of the phosphonates, HEDP is preferably used as a builder. In addition, the aminoalkane phosphonates have a pronounced heavy metal binding capacity. Accordingly, it can be of advantage, particularly where the foams also contain bleach, to use aminoalkane phosphonates, more particularly DTPMP, or mixtures of the phosphonates mentioned.

In addition, any compounds capable of forming complexes with alkaline earth metal ions may be used as co-builders.

According to the invention, compositions preferably produced by the process according to the invention are characterized in that they contain builders, preferably from the group of silicates, carbonates, organic cobuilders and/or phosphates, in quantities of 1 to 99.5% by weight, preferably in quantities of 1 to 95% by weight, more preferably in quantities of 5 to 90% by weight and most preferably in quantities of 10 to 80% by weight, based on the composition.

Surfactants

According to the invention, preferred detergents and/or cleaning compositions contain one or more surfactant(s) from the groups of anionic, nonionic, cationic and/or amphoteric surfactants.

The anionic surfactants used are, for example, those of the sulfonate and sulfate type. Preferred surfactants of the sulfonate type are $C_{9-13}$ alkyl benzenesulfonates, olefin sulfonates, i.e. mixtures of alkene and hydroxy-alkane sulfonates, and the disulfonates obtained, for example, from $C_{12-18}$ monoolefins with an internal or terminal double bond by sulfonation with gaseous sulfur trioxide and subsequent alkaline or acidic hydrolysis of the sulfonation products. Other suitable surfactants of the sulfonate type are the alkane sulfonates obtained from $C_{12-18}$ alkanes, for example by sulfochlorination or sulfoxidation and subsequent hydrolysis or neutralization. The esters of α-sulfofatty acids (ester sulfonates), for example the α-sulfonated methyl esters of hydrogenated coconut oil, palm kernel oil or tallow fatty acids, are also suitable.

Other suitable anionic surfactants are sulfonated fatty acid glycerol esters, i.e. the monoesters, diesters and triesters and mixtures thereof which are obtained where production is carried out by esterification of a monoglycerol with 1 to 3 moles of fatty acid or in the transesterification of triglycerides with 0.3 to 2 moles of glycerol. Preferred sulfonated fatty acid glycerol esters are the sulfonation products of saturated $C_{6-22}$ fatty acids, for example caproic acid, caprylic acid, capric acid, myristic acid, lauric acid, palmitic acid, stearic acid or behenic acid.

Preferred alk(en)yl sulfates are the alkali metal salts and, in particular, the sodium salts of the sulfuric acid semiesters of $C_{12-18}$ fatty alcohols, for example coconut alcohol, tallow alcohol, lauryl, myristyl, cetyl or stearyl alcohol, or $C_{10-20}$ oxoalcohols and the corresponding semiesters of secondary alcohols with the same chain length. Other preferred alk(en)yl sulfates are those with the chain length mentioned which contain a synthetic, linear alkyl chain based on a petrochemical and which are similar in their degradation behavior to the corresponding compounds based on oleochemical raw materials. $C_{12-16}$ alkyl sulfates and $C_{12-15}$ alkyl sulfates and also $C_{14-15}$ alkyl sulfates are particularly preferred from the washing performance point of view. Other suitable anionic surfactants are 2,3-alkyl sulfates which are commercially obtainable as products of the Shell Oil Company under the name of DAN®.

The sulfuric acid monoesters of linear or branched $C_{7-21}$ alcohols ethoxylated with 1 to 6 moles of ethylene oxide, such as 2-methyl-branched $C_{9-11}$ alcohols containing on average 3.5 moles of ethylene oxide (EO) or $C_{12-18}$ fatty alcohols containing 1 to 4 EO, are also suitable. In view of their high foaming capacity, they are normally used in only relatively small quantities, for example in quantities of 1 to 5% by weight, in cleaning compositions.

Other suitable anionic surfactants are the salts of alkyl sulfosuccinic acid which are also known as sulfosuccinates or as sulfosuccinic acid esters and which represent monoesters and/or diesters of sulfosuccinic acid with alcohols, preferably fatty alcohols and, more particularly, ethoxylated fatty alcohols. Preferred sulfosuccinates contain $C_{8-18}$ fatty alcohol molecules or mixtures thereof. Particularly preferred sulfosuccinates contain a fatty alcohol molecule derived from ethoxylated fatty alcohols which, considered in isolation, represent nonionic surfactants (for a description, see below). Of these sulfosuccinates, those of which the fatty alcohol molecules are derived from narrow-range ethoxylated fatty alcohols are particularly preferred. Alk(en)yl succinic acid preferably containing 8 to 18 carbon atoms in the alk(en)yl chain or salts thereof may also be used.

Other suitable anionic surfactants are, in particular, soaps. Suitable soaps are, in particular, saturated fatty acid soaps, such as the salts of lauric acid, myristic acid, palmitic acid, stearic acid, hydrogenated erucic acid and behenic acid, and soap mixtures derived in particular from natural fatty acids, for example coconut oil, palm kernel oil or tallow fatty acids.

The anionic surfactants, including the soaps, may be present in the form of their sodium, potassium or ammonium salts and as soluble salts of organic bases, such as mono-, di- or triethanolamine. The anionic surfactants are preferably present in the form of their sodium or potassium salts and, more preferably, in the form of their sodium salts.

Another group of detersive substances are the nonionic surfactants. Preferred nonionic surfactants are alkoxylated, advantageously ethoxylated, more especially primary alcohols preferably containing 8 to 18 carbon atoms and, on average, 1 to 12 moles of ethylene oxide (EO) per mole of alcohol, in which the alcohol radical may be linear or, preferably, methyl-branched in the 2-position or may contain linear and methyl-branched radicals in the form of the mixtures typically present in oxoalcohol radicals. However, alcohol ethoxylates containing linear radicals of alcohols of native origin with 12 to 18 carbon atoms, for example coconut oil, palm oil, tallow or oleyl alcohol, and on average 2 to 8 EO per mole of alcohol are particularly preferred. Preferred ethoxylated alcohols include, for example, $C_{12-14}$ alcohols containing 3 EO or 4 EO, $C_{9-11}$ alcohol containing 7 EO, $C_{13-15}$ alcohols containing 3 EO, 5 EO, 7 EO or 8 EO, $C_{12-18}$ alcohols containing 3 EO, 5 EO or 7 EO and mixtures thereof, such as mixtures of $C_{12-14}$ alcohol containing 3 EO and $C_{12-18}$ alcohol containing 5 EO. The degrees of ethoxylation mentioned represent statistical mean values which, for a special product, can be a whole number or a broken number. Preferred alcohol ethoxylates have a narrow homolog distribution (narrow range ethoxylates, NRE). In addition to these nonionic surfactants, fatty alcohols containing more than 12 EO may also be used, examples including tallow fatty alcohol containing 14 EO, 25 EO, 30 EO or 40 EO.

Another class of preferred nonionic surfactants which may be used either as sole nonionic surfactant or in combination with other nonionic surfactants are alkoxylated, preferably ethoxylated or ethoxylated and propoxylated, fatty acid alkyl esters preferably containing 1 to 4 carbon atoms in the alkyl chain, more especially fatty acid methyl esters.

Another class of nonionic surfactants which may advantageously be used are the alkyl polyglycosides (APGs). Suitable alkyl polyglycosides correspond to the general formula $RO(G)_z$ where R is a linear or branched, more particularly 2-methyl-branched, saturated or unsaturated aliphatic radical containing 8 to 22 and preferably 12 to 18 carbon atoms and G stands for a glycose unit containing 5 or 6 carbon atoms, preferably glucose. The degree of glycosidation is between 1.0 and 4.0, preferably between 1.0 and 2.0 and more preferably between 1.1 and 1.4. Linear alkyl polyglucosides, i.e. alkyl polyglycosides in which the polyglycosyl moiety is a glucose unit and the alkyl moiety is an n-alkyl group, are preferably used.

Nonionic surfactants of the amine oxide type, for example N-cocoalkyl-N,N-dimethylamine oxide and N-tallowalkyl-N,N-dihydroxyethylamine oxide, and the fatty acid alkanolamide type are also suitable. The quantity in which these nonionic surfactants are used is preferably no more than the quantity in which the ethoxylated fatty alcohols are used and, more preferably, no more than half that quantity.

Other suitable surfactants are polyhydroxyfatty acid amides corresponding to formula (IX):

in which RCO is an aliphatic acyl group containing 6 to 22 carbon atoms, $R^1$ is hydrogen, an alkyl or hydroxyalkyl group containing 1 to 4 carbon atoms and [Z] is a linear or branched polyhydroxyalkyl group containing 3 to 10 carbon atoms and 3 to 10 hydroxyl groups. The polyhydroxyfatty acid amides are known substances which may normally be obtained by reductive amination of a reducing sugar with ammonia, an alkylamine or an alkanolamine and subsequent acylation with a fatty acid, a fatty acid alkyl ester or a fatty acid chloride.

The group of polyhydroxyfatty acid amides also includes compounds corresponding to formula (X):

in which R is a linear or branched alkyl or alkenyl group containing 7 to 12 carbon atoms, $R^1$ is a linear, branched or cyclic alkyl group or an aryl group containing 2 to 8 carbon atoms and $R^2$ is a linear, branched or cyclic alkyl group or an aryl group or an oxyalkyl group containing 1 to 8 carbon atoms, $C_{1-4}$ alkyl or phenyl groups being preferred, and [Z] is a linear polyhydroxyalkyl group, of which the alkyl chain is substituted by at least two hydroxyl groups, or alkoxylated, preferably ethoxylated or propoxylated, derivatives of that group.

[Z] is preferably obtained by reductive amination of a reduced sugar, for example glucose, fructose, maltose, lactose, galactose, mannose or xylose. The N-alkoxy- or N-aryloxy-substituted compounds may then be converted into the required polyhydroxyfatty acid amides by reaction with fatty acid methyl esters in the presence of an alkoxide as catalyst.

In the production of dishwasher detergents, the surfactants used may again generally be selected from any surfactants. However, the nonionic surfactants described above are preferably used for this particular application, low-foaming nonionic surfactants being particularly suitable. Alkoxylated alcohols, above all ethoxylated and/or propoxylated alcohols, are particularly preferred. The expert generally understands alkoxylated alcohols to be the reaction products of alkylene oxide, preferably ethylene oxide, with alcohols, preferably—for the purposes of the present invention—relatively long-chain alcohols ($C_{10}$ to $C_{18}$, preferably $C_{12}$ to $C_{16}$, such as for example $C_{11}$, $C_{12}$, $C_{13}$, $C_{14}$, $C_{15}$, $C_{16}$, $C_{17}$ and $C_{18}$ alcohols). In general, a complex mixture of addition products with different degrees of ethoxylation is formed from n moles of ethylene oxide and 1 mole of alcohol, depending on the reaction conditions. Another embodiment consists in the use of mixtures of alkylene oxide, preferably a mixture of ethylene oxide and propylene oxide. If desired, "end-capped" alcohol ethoxylates, which may also be used in accordance with the invention, may also be obtained by etherification with short-chain alkyl groups, such as preferably the butyl group, in a concluding step. Highly ethoxylated fatty alcohols or mixtures thereof with end-capped fatty alcohol ethoxylates are most particularly preferred for the purposes of the invention.

According to the invention, particularly preferred nonionic surfactants are low-foaming nonionic surfactants which contain alternating ethylene oxide and alkylene oxide units. Preferred representatives of these surfactants are those which contain EO-AO-EO-AO blocks where one to ten EO or AO groups are attached to one another before a block of the other groups follows. Preferred dishwasher detergents produced in accordance with the invention are characterized in that they contain as nonionic surfactant(s) surfactants corresponding to general formula XI:

ferred dishwasher detergents produced by the process according to the invention are characterized in that $R^2$ or $R^3$ represents a group —$CH_3$, w and x independently of one another have values of 3 or 4 and y and z independently of one another have values of 1 or 2.

To sum up, nonionic surfactants containing a $C_{9-15}$ alkyl group with 1 to 4 ethylene oxide units followed by 1 to 4 propylene oxide units followed by 1 to 4 ethylene oxide units followed by 1 to 4 propylene oxide units are preferred for use in the compositions produced by the process according to the invention.

Low-foaming nonionic surfactants are used as preferred additional surfactants. In a particularly preferred embodiment, the detergents and/or cleaning compositions contain a nonionic surfactant which has a melting point above room temperature. Accordingly, preferred compositions are characterized in that they contain (a) nonionic surfactant(s) with a melting point above 20° C. preferably above 25° C. more preferably between 25 and 60° C. and, more particularly, between 26.6 and 43.3° C.

Suitable nonionic surfactants with melting or softening points in the temperature range mentioned above which are present in addition to the preferred nonionic surfactants are, for example, low-foaming nonionic surfactants which may be solid or highly viscous at room temperature. If nonionic surfactants highly viscous at room temperature are used, they preferably have a viscosity above 20 Pas, more preferably above 35 Pas and most preferably above 40 Pas.

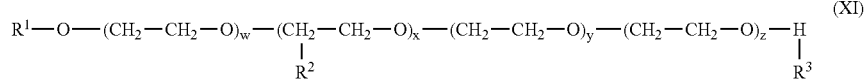
(XI)

in which $R^1$ is a linear or branched, saturated or mono- or polyunsaturated $C_{6-24}$ alkyl or alkenyl group; the groups $R^2$ and $R^3$ independently of one another are each selected from —$CH_3$; —$CH_2CH_3$, —$CH_2CH_2$—$CH_3$, —$CH(CH_3)_2$ and the indices w, x, y and z independently of one another stand for integers of 1 to 6.

Preferred nonionic surfactants (XI) may be obtained by known methods from the corresponding alcohols $R^1$—OH and ethylene or alkylene oxide. The substituent $R^1$ in formula (I) may vary according to the origin of the alcohol. If native sources are used, the substituent $R^1$ has an even number of carbon atoms and is generally unbranched, the linear chains of alcohols of native origin containing 12 to 18 carbon atoms, for example of coconut oil, palm oil, tallow fatty alcohol or oleyl alcohol being preferred. Alcohols obtainable from synthetic sources are, for example, the Guerbet alcohols or 2-methyl-branched or linear or methyl-branched alcohols as normally present in oxoalcohols. Irrespective of the nature of the alcohol used to produce the nonionic surfactants present in the compositions, detergents and cleaning compositions produced in accordance with the invention where $R^1$ in formula (I) is a $C_{6-24}$, preferably $C_{8-20}$, more preferably $C_{9-15}$ and most preferably $C_{9-11}$ alkyl group are preferred.

Besides propylene oxide, butylene oxide in particular may be the alkylene oxide unit which is present in alternation with the ethylene oxide unit in the preferred nonionic surfactants. However, other alkylene oxides where $R^2$ and $R^3$ independently of one another are selected from —$CH_2CH_2$—$CH_3$ or —$CH(CH_3)_2$ are also suitable. Pre- Nonionic surfactants which are wax-like in consistency at room temperature are also preferred.

Preferred nonionic surfactants solid at room temperature belong the groups of alkoxylated nonionic surfactants, more particularly ethoxylated primary alcohols, and mixtures of these surfactants with structurally complex surfactants, such as polyoxypropylene/polyoxyethylene/polyoxypropylene (PO/EO/PO) surfactants. In addition, (PO/EO/PO) nonionic surfactants are distinguished by good foam control.

In one preferred embodiment of the present invention, the nonionic surfactant with a melting point above room temperature is an ethoxylated nonionic surfactant emanating from the reaction of a monohydroxyalkanol or alkylphenol containing 6 to 20 carbon atoms with preferably at least 12 mol, more preferably at least 15 mol and most preferably at least 20 mol of ethylene oxide per mole of alcohol or alkylphenol.

A particularly preferred nonionic surfactant solid at room temperature is obtained from a straight-chain fatty alcohol containing 16 to 20 carbon atoms ($C_{16-20}$ alcohol), preferably a $C_{18}$ alcohol, and at least 12 mol, preferably at least 15 mol and more preferably at least 20 mol of ethylene oxide. Of these nonionic surfactants, the so-called narrow range ethoxylates (see above) are particularly preferred.

Accordingly, particularly preferred compositions contain ethoxylated nonionic surfactant(s) obtained from $C_{6-20}$ monohydroxyalkanols or $C_{6-20}$ alkylphenols or $C_{16-20}$ fatty alcohols and more than 12 mol, preferably more than 15 mol and more particularly more than 20 mol ethylene oxide per mole alcohol.

The nonionic surfactant preferably also contains propylene oxide units in the molecule. These PO units preferably make up as much as 25% by weight, more preferably as much as 20% by weight and, most preferably, up to 15% by weight of the total molecular weight of the nonionic surfactant. Particularly preferred nonionic surfactants are ethoxylated monohydroxyalkanols or alkylphenols which additionally contain polyoxyethylene/polyoxypropylene block copolymer units. The alcohol or alkylphenol component of these nonionic surfactant molecules preferably makes up more than 30% by weight, more preferably more than 50% by weight and most preferably more than 70% by weight of the total molecular weight of these nonionic surfactants. Preferred dishwasher detergents produced by the process according to the invention are characterized in that they contain ethoxylated and propoxylated nonionic surfactants where the propylene oxide units in the molecule make up as much as 25% by weight, preferably 20% by weight and more particularly up to 15% by weight of the total molecular weight of the nonionic surfactant.

Other particularly preferred nonionic surfactants with melting points above room temperature contain 40 to 70% of a polyoxypropylene/polyoxyethylene/polyoxpropylene block polymer blend which contains 75% by weight of an inverted block copolymer of polyoxyethylene and polyoxypropylene with 17 mol ethylene oxide and 44 mol propylene oxide and 25% by weight of a block copolymer of polyoxyethylene and polyoxypropylene initiated with trimethylol propane and containing 24 mol ethylene oxide and 99 mol propylene oxide per mole of trimethylol propane.

Nonionic surfactants which may be used with particular advantage are obtainable, for example, under the name of Poly Tergent® SLF-18 from Olin Chemicals.

Another preferred dishwasher detergent produced in accordance with the invention contains nonionic surfactants corresponding to the following formula:

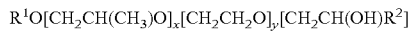

R$^1$O[CH$_2$CH(CH$_3$)O]$_x$[CH$_2$CH$_2$O]$_y$[CH$_2$CH(OH)R$^2$]

in which R$^1$ is a linear or branched aliphatic hydrocarbon radical containing 4 to 18 carbon atoms or mixtures thereof, R$^2$ is a linear or branched hydrocarbon radical containing 2 to 26 carbon atoms or mixtures thereof, x has a value of 0.5 to 1.5 and y has a value of at least 15.

Other preferred nonionic surfactants are the end-capped poly(oxyalkylated)nonionic surfactants corresponding to the following formula:

R$^1$O[CH$_2$CH(R$^3$)O]$_x$[CH$_2$]$_k$CH(OH)[CH$_2$]$_j$OR$^2$ in which R$^1$ and R$^2$ are linear or branched, saturated or unsaturated, aliphatic or aromatic hydrocarbon radicals containing 1 to 30 carbon atoms, R$^3$ stands for H or for a methyl, ethyl, n-propyl, isopropyl, n-butyl, 2-butyl or 2-methyl-2-butyl radical, x has a value of 1 to 30, k and j have values of 1 to 12 and preferably 1 to 5. Where x has a value of $\geq 2$, each substituent R$^3$ in the above formula may be different. R$^1$ and R$^2$ are preferably linear or branched, saturated or unsaturated, aliphatic or aromatic hydrocarbon radicals containing 6 to 22 carbon atoms, radicals containing 8 to 18 carbon atoms being particularly preferred. For the substituent R$^3$, H, —CH$_3$ or —CH$_2$CH$_3$ are particularly preferred. Particularly preferred values for x are in the range from 1 to 20 and more particularly in the range from 6 to 15.

As mentioned above, each substituent R$^3$ in the above formula may be different where x is $\geq 2$. In this way, the alkylene oxide unit in the square brackets can be varied. If, for example, x has a value of 3, the substituent R$^3$ may be selected to form ethylene oxide (R$^3$=H) or propylene oxide (R$^3$=CH$_3$) units which may be joined together in any order, for example (EO)(PO)(EO), (EO)(EO)(PO), (EO)(EO)(EO), (PO)(EO)(PO), (PO)(PO)(EO) and (PO)(PO)(PO). The value 3 for x was selected by way of example and may easily be larger, the range of variation increasing with increasing x-values and including, for example, a large number of (EO) groups combined with a small number of (PO) groups or vice versa.

Particularly preferred end-capped poly(oxyalkylated) alcohols corresponding to the above formula have values for both k and j of 1, so that the above formula can be simplified to:

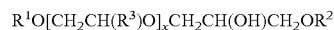

R$^1$O[CH$_2$CH(R$^3$)O]$_x$CH$_2$CH(OH)CH$_2$OR$^2$

In this formula, R$^1$, R$^2$ and R$^3$ are as defined above and x has a value of 1 to 30, preferably 1 to 20 and more preferably 6 to 18. Surfactants in which the substituents R$^1$ and R$^2$ have 9 to 14 carbon atoms, R$^3$ stands for H and x has a value of 6 to 15 are particularly preferred.

To sum up, preferred detergents and/or cleaning compositions are those which contain end-capped poly(oxyalkylated) nonionic surfactants corresponding to the following formula:

R$^1$O[CH$_2$CH(R$^3$)O]$_x$[CH$_2$]$_k$CH(OH)[CH$_2$]$_j$OR$^2$ in which R$^1$ and R$^2$ are linear or branched, saturated or unsaturated, aliphatic or aromatic hydrocarbon radicals containing 1 to 30 carbon atoms, R$^3$ stands for H or for a methyl, ethyl, n-propyl, isopropyl, n-butyl, 2-butyl or 2-methyl-2-butyl radical, x has a value of 1 to 30, k and j have values of 1 to 12 and preferably 1 to 5, surfactants of the following type:

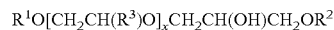

R$^1$O[CH$_2$CH(R$^3$)O]$_x$CH$_2$CH(OH)CH$_2$OR$^2$ where x has a value of 1 to 30, preferably 1 to 20 and more preferably 6 to 18, being particularly preferred.

Anionic, cationic and/or amphoteric surfactants may also be used in conjunction with the surfactants mentioned although they are of only minor importance for dishwasher detergents in view of their foaming behavior and are generally only used in quantities below 10% by weight, mostly even below 5% by weight, for example in quantities of 0.01 to 2.5% by weight, based on the detergent. Accordingly, the compositions produced in accordance with the invention may also contain anionic, cationic and/or amphoteric surfactants as a surfactant component.

In a preferred embodiment of the invention, the detergents and/or cleaning compositions contain surfactant(s), preferably nonionic surfactant(s), in quantities of 0.5 to 10% by weight, preferably 0.75 to 7.5% by weight and more paticularly 1.0 to 5% by weight, based on the composition as a whole.

Bleaching Agents

Bleaching agents and bleach activators are important constituents of detergents and cleaning compositions and, according to the invention, a detergent and cleaning composition may contain one or more substances from the groups mentioned. Among the compounds yielding H$_2$O$_2$ in water which serve as bleaching agents, sodium percarbonate is particularly important. Other useful bleaching agents are, for example, sodium perborate tetrahydrate and sodium perborate monohydrate, peroxopyrophosphates, citrate perhydrates and H$_2$O$_2$-yielding peracidic salts or per acids, such as perbenzoates, peroxophthalates, diperazelaic acid, phthaliminoperacids or diperdodecanedioic acid.

"Sodium percarbonate" is a non-specific term used for sodium carbonate peroxohydrates which, strictly speaking, are not "percarbonates" (i.e. salts of percarbonic acid), but hydrogen peroxide adducts with sodium carbonate. The commercial material has the mean composition 2 Na$_2$CO$_3$.3 H$_2$O$_2$ and, accordingly, is not a peroxycarbonate. Sodium percarbonate forms a white water-soluble powder with a density of 2.14 gcm$^{-3}$ which readily decomposes into sodium carbonate and bleaching or oxidizing oxygen.

Sodium carbonate peroxohydrate was obtained for the first time in 1899 by precipitation with ethanol from a solution of sodium carbonate in hydrogen peroxide, but was mistakenly regarded as peroxycarbonate. It was only in 1909 that the compound was recognised as a hydrogen peroxide addition compound. Nevertheless, the historical name "sodium percarbonate" has been adopted in practice.

On an industrial scale, sodium percarbonate is mainly produced by precipitation from aqueous solution (so-called wet process). In this process, aqueous solutions of sodium carbonate and hydrogen peroxide are combined and the sodium percarbonate is precipitated by salting-out agents (mainly sodium chloride), crystallization aids (for example polyphosphates, polyacrylates) and stabilizers (for example Mg$^{2+}$ ions). The precipitated salt which still contains 5 to 12% by weight of mother liquor is then removed by centrifuging and dried at 90° C. in fluidized bed dryers. The bulk density of the end product can vary between 800 and 1200 g/l according to the production process. In general, the percarbonate is stabilized by an additional coating. Coating processes and materials are widely described in the patent literature. Basically, any commercially available percarbonate types as marketed, for example, by Solvay Interox, Degussa, Kemira and Akzo may be used in accordance with the present invention.

Dishwasher detergents may also contain bleaching agents from the group of organic bleaches. Typical organic bleaching agents which may be used as ingredients in accordance with the invention are diacyl peroxides, such as dibenzoyl peroxide for example. Other typical organic bleaching agents are the peroxy acids, of which alkyl peroxy acids and aryl peroxy acids are particularly mentioned as examples. Preferred representatives are (a) peroxybenzoic acid and ring-substituted derivatives thereof, such as alkyl peroxybenzoic acids, but also peroxy-α-naphthoic acid and magnesium monoperphthalate, (b) aliphatic or substituted aliphatic peroxy acids, such as peroxylauric acid, peroxystearic acid, ε-phthalimidoperoxycaproic acid [phthaloiminoperoxyhexanoic acid (PAP)], o-carboxybenzamidoperoxycaproic acid, N-nonenylamidoperadipic acid and N-nonenylamidopersuccinates and (c) aliphatic and araliphatic peroxydicarboxylic acids, such as 1,12-diperoxycarboxylic acid, 1,9-diperoxyazelaic acid, diperoxysebacic acid, diperoxybrassylic acid, diperoxyphthalic acids, 2-decyldiperoxybutane-1,4-dioic acid, N,N-terephthaloyl-di(6-aminopercaproic acid).

Other suitable bleaching agents for machine dishwashing according to the invention are chlorine- and bromine-releasing substances. Suitable chlorine- or bromine-releasing materials are, for example, heterocyclic N-bromamides and N-chloramides, for example trichloroisocyanuric acid, tribromoisocyanuric acid, dibromoisocyanuric acid and/or dichloroisocyanuric acid (DICA) and/or salts thereof with cations, such as potassium and sodium. Hydantoin compounds, such as 1,3-dichloro-5,5-dimethyl hydantoin, are also suitable.

Advantageous compositions according to the invention contain one or more bleaching agents, preferably from the group of oxygen or halogen bleaching agents, more particularly chlorine bleaching agents, and more preferably sodium percarbonate and/or sodium perborate monohydrate, in quantities of 0.5 to 40% by weight, preferably 1 to 30% by weight, more preferably 2.5 to 25% by weight and most preferably 5 to 20% by weight, based on the composition as a whole.

Bleach Activators

In order to obtain an improved bleaching effect where cleaning is carried out at temperatures of 60° C. or lower, cleaning compositions according to the invention may contain bleach activators. Suitable bleach activators are compounds which form aliphatic peroxocarboxylic acids containing preferably 1 to 10 carbon atoms and more preferably 2 to 4 carbon atoms and/or optionally substituted perbenzoic acid under perhydrolysis conditions. Substances bearing O- and/or N-acyl groups with the number of carbon atoms mentioned and/or optionally substituted benzoyl groups are suitable. Preferred bleach activators are polyacylated alkylenediamines, more particularly tetraacetyl ethylenediamine (TAED), acylated triazine derivatives, more particularly 1,5-diacetyl-2,4-dioxohexahydro-1,3,5-triazine (DADHT), acylated glycolurils, more particularly tetraacetyl glycoluril (TAGU), N-acylimides, more particularly N-nonanoyl succinimide (NOSI), acylated phenol sulfonates, more particularly n-nonanoyl- or isononanoyl-oxybenzenesulfonate (n- or iso-NOBS), carboxylic anhydrides, more particularly phthalic anhydride, acylated polyhydric alcohols, more particularly triacetin, ethylene glycol diacetate and 2,5-diacetoxy-2,5-dihydrofuran.

In addition to or instead of the conventional bleach activators mentioned above, so-called bleach catalysts may also be incorporated in the cleaning compositions. These substances are bleach-boosting transition metal salts or transition metal complexes such as, for example, manganese-, iron-, cobalt-, ruthenium- or molybdenum-salen or -carbonyl complexes. Manganese, iron, cobalt, ruthenium, molybdenum, titanium, vanadium and copper complexes with nitrogen-containing tripod ligands and cobalt-, iron-, copper- and ruthenium-ammine complexes may also be used as bleach catalysts.

Preferred compositions produced in accordance with the invention contain one or more substances from the group of bleach activators, more particularly from the groups of polyacylated alkylenediamines, more particularly tetraacetyl ethylenediamine (TAED), N-acyl imides, more particularly N-nonanoyl succinimide (NOSI), acylated phenol sulfonates, more particularly n-nonanoyl- or isononanoyl-oxybenzenesulfonate (n- or iso-NOBS) and n-methyl morpholinium acetonitrile methyl sulfate (MMA), in quantities of 0.1% by weight to 20% by weight, more preferably in quantities of 0.5 to 15% by weight and, with particular advantage, in quantities of 1 to 10% by weight, based on the composition as a whole.

Preferred bleach activators according to the invention also include "nitrilequats", i.e. cationic nitriles corresponding to formula (XII):

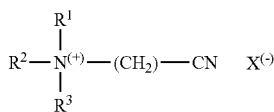

(XII)

in which $R^1$ represents —H, —$CH_3$, a $C_{2-24}$ alkyl or alkenyl group, a substituted $C_{2-24}$ alkyl or alkenyl group with at least one substituent from the group consisting of —Cl, —Br, —OH, —$NH_2$, —CN, an alkyl or alkenyl aryl group containing a $C_{1-24}$ alkyl group or a substituted alkyl or alkenyl aryl group containing a $C_{1-24}$ alkyl group and at least one other substituent at the aromatic ring, $R^2$ and $R^3$ independently of one another are selected from —$CH_2$—CN, —$CH_3$, —$CH_2$—$CH_3$, —$CH_2$—$CH_2$—$CH_3$, —$CH(CH_3)$—$CH_3$, —$CH_2$—OH, —$CH_2$—$CH_2$—OH, —$CH(OH)$—$CH_3$, —$CH_2$—$CH_3$—$CH_2$—OH, —$CH_2$—$CH(OH)$—$CH_3$, —$CH(OH)$—$CH_2$—$CH_3$, —$(CH_2CH_2$—$O)_n$H where n=1, 2, 3, 4, 5 or 6 and X is an anion.

General formula (I) encompasses a number of cationic nitriles which may be used in accordance with the present invention. In one particularly advantageous embodiment, the detergents and cleaning compositions produced in accordance with the invention contain cationic nitriles in which $R^1$ stands for methyl, ethyl, propyl, isopropyl or an n-butyl, n-hexyl, n-octyl, n-decyl, n-dodecyl, n-tetradecyl, n-hexadecyl or n-octadecyl group. $R^2$ and $R^3$ are preferably selected from methyl, ethyl, propyl, isopropyl and hydroxyethyl; one or both of these substituents may with advantage even be a cyanomethylene group.

In the interests of easier synthesis, preferred compounds are those in which the substituents $R^1$ to $R^3$ are identical, for example $(CH_3)_3N^{(+)}CH_2$—CN $X^-$, $(CH_3CH_2)_3N^{(+)}CH_2$—CN $X^-$, $(CH_3CH_2CH_2)_3N^{(+)}CH_2$—CN $X^-$, $(CH_3CH(CH_3))_3N^{(+)}CH_2$—CN $X^-$ or $(HO$—$CH_2$—$CH_2)_3N^{(+)}CH_2$—CN $X^-$, where $X^-$ is preferably an anion selected from the group consisting of chloride, bromide, iodide, hydrogen sulfate, methosulfate, p-toluene sulfonate (tosylate) or xylene sulfonate.

Preferred detergents and cleaning compositions according to the invention are characterized in that they contain the cationic nitrile (XII) in quantities of 0.1 to 20% by weight, preferably 0.25 to 15% by weight and more particularly 0.5 to 10% by weight, based on the weight of the shaped body.

Enzymes

Suitable enzymes are, in particular, those from the classes of hydrolases, such as proteases, esterases, lipases or lipolytic enzymes, amylases, cellulases or other glycosyl hydrolases and mixtures thereof. All these hydrolases contribute to the removal of stains, such as protein-containing, fat-containing or starch-containing stains, and discoloration in the washing process. In addition, cellulases and other glycosyl hydrolases can contribute towards color retention and towards increasing fabric softness by removing pilling and microfibrils. Oxidoreductases may also be used for bleaching and for inhibiting dye transfer. Enzymes obtained from bacterial strains or fungi, such as *Bacillus subtilis, Bacillus licheniformis, Streptomyces griseus, Coprinus cinereus* and *Humicola insolens* and from genetically modified variants are particularly suitable. Proteases of the subtilisin type are preferably used, proteases obtained from *Bacillus lentus* being particularly preferred. Of particular interest in this regard are enzyme mixtures, for example of protease and amylase or protease and lipase or lipolytic enzymes or protease and cellulase or of cellulase and lipase or lipolytic enzymes or of protease, amylase and lipase or lipolytic enzymes or protease, lipase or lipolytic enzymes and cellulase, but especially protease- and/or lipase-containing mixtures or mixtures with lipolytic enzymes. Examples of such lipolytic enzymes are the known cutinases.

Peroxidases or oxidases have also been successfully used in some cases. Suitable amylases include in particular α-amylases, isoamylases, pullanases and pectinases. Preferred cellulases are cellobiohydrolases, endoglucanases and β-glucosidases, which are also known as cellobiases, and mixtures thereof. Since the various cellulase types differ in their CMCase and avicelase activities, the desired activities can be established by mixing the cellulases in the appropriate ratios.

The enzymes may be adsorbed to supports and/or encapsulated in membrane materials to protect them against premature decomposition. Preferred compositions produced in accordance with the invention contain enzymes, preferably in the form of liquid and/or solid enzyme preparations, in quantities of 0.1 to 10% by weight, preferably in quantities of 0.5 to 8% by weight and more particularly in quantities of 1 to 5% by weight.

Dyes

In order to improve their aesthetic impression, the detergents and cleaning compositions produced by the process according to the invention may be colored with suitable dyes. According to the invention, preferred dyes, which are not difficult for the expert to choose, have high stability in storage, are not affected by the other ingredients of the compositions or by light and do not have any pronounced substantivity for textile fibers so as not to color them.

Any dyes which can be destroyed by oxidation in the washing process and mixtures thereof with suitable blue dyes, so-called blueing agents, are preferably used in the detergents and cleaning compositions produced in accordance with the invention. It has proved to be of advantage to use dyes which are soluble in water or—at room temperature—in liquid organic substances. Suitable dyes are, for example, anionic dyes, for example anionic nitroso dyes. One possible dye is, for example, naphthol green (Color Index (CI) Part 1: Acid Green 1; Part 2: 10020), which is commercially available for example as Basacid® Grün 970 from BASF, Ludwigshafen, and mixtures thereof with suitable blue dyes. Other suitable dyes are Pigmosol® Blau 6900 (CI 74160), Pigmosol® Grün 8730 (CI 74260), Basonyl® Rot 545 FL (CI 45170), Sandolan® Rhodamin EB 400 (CI 45100), Basacid® Gelb 094 (CI 47005), Sicovit® Patentblau 85 E 131 (CI 42051), Acid Blue 183 (CAS 12217-22-0, CI Acid Blue 183), Pigment Blue 15 (CI 74160), Supranol® Blau GLW (CAS 12219-32-8, CI Acid Blue 221)), Nylosan® Gelb N-7GL SGR (CAS 61814-57-1, CI Acid Yellow 218) and/or Sandolan® Blau (CI Acid Blue 182, CAS 12219-26-0).

In selecting the dye, it is important to ensure that the dye does not have an excessive affinity for the textile surfaces and, in particular, for synthetic fibers. Another factor to be taken into account in the selection of suitable dyes is that dyes differ in their stability to oxidation. Generally speaking, water-insoluble dyes are more stable to oxidation than water-soluble dyes. The concentration of the dye in the detergents varies according to its solubility and hence its sensitivity to oxidation. In the case of readily water-soluble dyes, for example the above-mentioned Basacid® Grün and Sandolan® Blau, dye concentrations in the range from a few $10^{-2}$ to $10^{-3}$% by weight are typically selected. By contrast, in the case of the pigment dyes which are particularly preferred for their brilliance, but which are less readily soluble in water, for example the above-mentioned Pigmosol® dyes, suitable concentrations of the dye in detergents and cleaning compositions are typically of the order of a few $10^{-3}$ to $10^{-4}$% by weight.

Corrosion Inhibitors

To protect the tableware or the machine itself, dishwasher detergents may contain corrosion inhibitors, silver protectors being particularly important for dishwashing machines. Known corrosion inhibitors may be used. Above all, silver protectors selected from the group of triazoles, benzotriazoles, bisbenzotriazoles, aminotriazoles, alkylaminotriazoles and the transition metal salts or complexes may generally be used. Benzotriazole and/or alkylaminotriazole is/are particularly preferred. In addition, dishwashing formulations often contain corrosion inhibitors containing active chlorine which are capable of distinctly reducing the corrosion of silver surfaces. Chlorine-free dishwashing detergents contain in particular oxygen- and nitrogen-containing organic redox-active compounds, such as dihydric and trihydric phenols, for example hydroquinone, pyrocatechol, hydroxyhydroquinone, gallic acid, phloroglucinol, pyrogallol and derivatives of these compounds. Salt-like and complex-like inorganic compounds, such as salts of the metals Mn, Ti, Zr, Hf, V, Co and Ce are also frequently used. Of these, the transition metal salts selected from the group of manganese and/or cobalt salts and/or complexes are preferred, particular preference being attributed to cobalt(ammine) complexes, cobalt(acetate) complexes, cobalt(carbonyl) complexes, chlorides of cobalt or manganese and manganese sulfate and to the manganese complexes

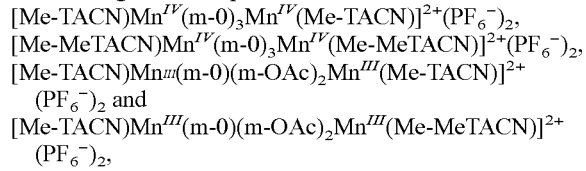

[Me-TACN)Mn$^{IV}$(m-0)$_3$Mn$^{IV}$(Me-TACN)]$^{2+}$(PF$_6^-$)$_2$,
[Me-MeTACN)Mn$^{IV}$(m-0)$_3$Mn$^{IV}$(Me-MeTACN)]$^{2+}$(PF$_6^-$)$_2$,
[Me-TACN)Mn$^{III}$(m-0)(m-OAc)$_2$Mn$^{III}$(Me-TACN)]$^{2+}$ (PF$_6^-$)$_2$ and
[Me-TACN)Mn$^{III}$(m-0)(m-OAc)$_2$Mn$^{III}$(Me-MeTACN)]$^{2+}$ (PF$_6^-$)$_2$, where Me-TACN stands for 1,4,7-trimethyl-1,4,7-triazacyclononane and Me-MeTACN for 1,2,4,7-tetramethyl-1,4,7-triazacyclononane. Zinc compounds may also be used to prevent corrosion to tableware.

According to the invention, preferred dishwasher detergents additionally contain at least one silver protector selected from the group of triazoles, benzotriazoles, bisbenzotriazole, aminotriazoles, alkylaminotriazoles, preferably benzotriazole and/or alkylaminotriazole, in quantities of 0.001 to 1% by weight, preferably in quantities of 0.01 to 0.5% by weight and more particularly in quantities of 0.05 to 0.25% by weight, based on the composition as a whole.

Glass Corrosion Inhibitors

Besides the silver protectors mentioned above, the perfumed dishwasher detergents produced by the process according to the invention may also contain one or more substances for reducing the corrosion of glass. According to the present invention, additions of zinc and/or inorganic and/or organic zinc salts and/or silicates, for example the layered crystalline sodium disilicate SKS 6 from Clariant GmbH, and/or water-soluble glasses, for example glasses which undergo a weight loss of at least 0.5 mg under the conditions specified in DIN ISO 719, are particularly preferred for reducing glass corrosion. Particularly preferred compositions contain at least one zinc salt of an organic acid, preferably selected from the group consisting of zinc oleate, zinc stearate, zinc gluconate, zinc acetate, zinc lactate and zinc citrate, in quantities of 0.1 to 5% by weight, preferably in quantities of 0.2 to 4% by weight and more particularly in quantities of 0.4 to 3% by weight, based on the total weight of the composition after perfuming.

The compositions produced by the process may optionally be provided with a pack. A pack has the advantage of preventing the premature volatilization of the perfumes subsequently applied, particularly in the event of prolonged storage. The pack preferably accommodates one or more laundry/dishwasher detergent shaped bodies in a single packaging unit, depending on the embodiment of the invention. In one preferred embodiment of the invention, either a shaped body may be made up in such a way that it constitutes a dose or dosage unit of the laundry/dishwasher detergent and may be individually packed or shaped bodies may be packed in a packaging unit in numbers which, overall, constitutes a dose or dosage unit. Accordingly, for a prescribed dose of 80 g of detergent, it is possible in accordance with the invention to produce and individually pack a detergent shaped body weighing 80 g. However, it is also possible in accordance with the invention to pack two detergent shaped bodies each weighing 40 g in one pack in order to obtain a combination according to the invention. This principle may of course also be extended so that, according to the invention, combinations of three, four, five or even more detergent shaped bodies may be accommodated in one and the same pack. Two or more shaped bodies in the same pack may of course have different compositions. In this way, certain components can be spatially separated from one another in order, for example, to avoid stability problems.

The described packaging system may consist of various materials and may assume various external forms. For economic reasons and in the interests of easier processability, however, preferred packs are those in which the packaging material is light in weight, easy to process and inexpensive. In preferred combinations according to the invention, the pack system consists of a bag of single-layer or laminated paper and/or plastic film.

The laundry/dishwasher detergent shaped bodies may be introduced without sorting, i.e. loosely, into a bag of the materials mentioned above. However, for aesthetic reasons and for sorting the combinations in secondary packs, bags are filled either with single shaped bodies or with several shaped bodies in sorted form. The term "flow pack" is now commonly used for individual dosage units of the detergent shaped bodies accommodated in a bag. Flow packs may optionally be packed—again preferably sorted—in outer packs which underscores the compact supply form of shaped bodies.

The bags of single-layer or laminated paper or plastic film preferably used as the packaging system may be designed in various ways, for example as inflated bags with no center seam or as bags with a center seam which are closed by heat (heat sealing), adhesives or adhesive tape. Single-layer bag materials are the known papers, which may optionally be impregnated, and plastic films which may optionally be co-extruded. Plastic films which may be used as the packaging system according to the invention are described, for example, in Hans Domininghaus "Die Kunststoffe und ihre Eigenschaften" 3rd Edition, VDI Verlag, Düsseldorf, 1988, page 193.

EXAMPLES

The perfumed shaped bodies produced by the process according to the invention were subjected to a perfume test. To this end, the following two samples produced by different processes were produced on the basis of a commercially available dishwasher detergent:

A conventionally produced shaped body (Somat 3-in-1, a product of Henkel KGaA) with a perfume content of 0.1% by weight, in the production of which the perfume was added to the detergent premix before shaping, and a detergent shaped body with the same composition (sample B) produced by the process according to the invention, which was perfumed after shaping of the perfume-free detergent premix, were tested. Both samples were stored for one week (30° C. 80% air humidity) in an airtight pack (polypropylene, 50 µm film thickness) before the test.

The immediate perfume impression on opening of the airtight pack (test 1) and the direct tablet perfume (test 2) were evaluated. The scores range from 3 (good perfume experience) through 2 (normal perfume experience) to 1 (weak perfume experience). The results of these tests are set out in Table 1.

TABLE 1

|  | Test 1 | | Test 2 | |
| --- | --- | --- | --- | --- |
|  | Sample A | Sample B | Sample A | Sample B |
| Examiner A | 3 | 3 | 3 | 3 |
| Examiner B | 1 | 1 | 1 | 3 |
| Examiner C | 1 | 2 | 2 | 3 |
| Examiner D | 1 | 2 | 1 | 2 |
| Examiner E | 3 | 3 | 3 | 2 |
| Examiner F | 2 | 2 | 1 | 3 |
| Examiner G | 1 | 3 | 2 | 3 |
| Examiner H | 1 | 1 | 2 | 1 |
| Total | 13 | 17 | 15 | 20 |

It can be seen from the perfume test that, through the subsequent perfuming of the commercially available detergent shaped body in accordance with the teaching of the process according to the invention, both the immediate perfume experience on opening of the pack and the direct tablet perfume were improved for the same quantity of perfume used.

The invention claimed is:

1. A process for making a single- or multiphase detergent shaped body comprising one or more surfactants and one or more builders, comprising the steps of forming a perfume-free detergent premix into a shaped body, and treating the shaped body with one or both of one or more perfumes or one or more perfume-containing compositions having a perfume content of at least 20% by weight, wherein the shaped body is treated by spraying the one or both of one or more perfumes or one or more perfume-containing compositions, and wherein the shaped body has a cavity.

2. The process of claim 1, wherein the shaped body is formed by one or more steps selected from the group consisting of tabletting, extrusion, roller compacting, solidification, sintering, and crystallization.

3. The process of claim 1, wherein the shaped body is formed by tabletting.

4. The process of claim 1, wherein the cavity is treated with the one or both of one or more perfumes or one or more perfume-containing compositions.

5. The process of claim 1, wherein following treatment with the one or both of one or more perfumes or one or more perfume-containing compositions, the shaped body is at least partly sealed.

6. The process of claim 5, wherein the shaped body is at least partially sealed by a sealing material comprising one or more polyethylene glycols.

7. The process of claim 1, wherein the one or more perfume-containing compositions comprises one or more polyalkylene glycols.

8. A process for making a single- or multiphase detergent shaped body comprising one or more surfactants and one or more builders, comprising the steps of forming a perfume-free detergent premix into a shaped body, and treating the shaped body with one or both of one or more perfumes or one or more perfume-containing compositions having a perfume content of at least 20% by weight, wherein the shaped body has a cavity, and wherein at least one more single- or multiphase detergent shaped body is applied and adhesively bonded to the shaped body treated with the one or both of one or more perfumes or one or more perfume-containing compositions.

9. The process of claim 8, wherein the shaped body is formed by one or more steps selected from the group consisting of tabletting, extrusion, roller compacting, solidification, sintering, and crystallization.

10. The process of claim 8, wherein the shaped body is formed by tabletting.

11. The process of claim 8, wherein the cavity is treated with the one or both of one or more perfumes or one or more perfume-containing compositions.

12. The process of claim 8, wherein following treatment with the one or both of one or more perfumes or one or more perfume-containing compositions, the shaped body is at least partly sealed.

13. The process of claim 12, wherein the shaped body is at least partially sealed by a sealing material comprising one or more polyethylene glycols.

14. The process of claim 8, wherein the one or more perfume-containing compositions comprises one or more polyalkylene glycols.

* * * * *